(12) United States Patent
Sakamoto

(10) Patent No.: US 8,051,041 B2
(45) Date of Patent: Nov. 1, 2011

(54) APPARATUS AND METHOD FOR FILE DIFFERENCE MANAGEMENT

(75) Inventor: Yuu Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 548 days.

(21) Appl. No.: 12/191,471

(22) Filed: Aug. 14, 2008

(65) Prior Publication Data

US 2009/0049016 A1    Feb. 19, 2009

(30) Foreign Application Priority Data

Aug. 17, 2007   (JP) .................. 2007-213106

(51) Int. Cl.
*G06F 17/30* (2006.01)
(52) U.S. Cl. ....................... 707/640; 711/152
(58) Field of Classification Search .......... None
See application file for complete search history.

(56) References Cited

U.S. PATENT DOCUMENTS

2005/0210465 A1*  9/2005  Sasaki et al. .................. 717/175
2006/0161605 A1*  7/2006  Terazono et al. ............. 707/203

FOREIGN PATENT DOCUMENTS

JP    1998063557 A    3/1998
JP    2006178645 A    7/2006

* cited by examiner

*Primary Examiner* — Charles Kim
*Assistant Examiner* — Anteneh Girma

(57) ABSTRACT

File difference is managed. Group data and difference detection data tables are stored. A previous difference detection file, which is an original file of a difference management object file, is searched, and a difference between the previous difference detection file and the difference management object file is detected. Difference detection data is used to detect the difference, and is recorded on the difference detection data table. A group to which the difference management object file belongs is selected based on a group condition registered in the group data table. The difference is detected based on comparing extracted difference detection data and file data of the difference management object file. A set of the file data and the group is recorded as a new difference detection data on the difference detection data table, when the difference is detected.

21 Claims, 10 Drawing Sheets

Fig. 2

21: GROUP DATA TABLE

| GROUP NAME | GROUP CONDITION | FIXED FIELD OF FILE NAME | TYPE |
|---|---|---|---|
| host01 syslog.log (GROUP A) | host01:¥/var¥/adm¥/syslog¥/(OLD¦)syslog¥.log | preg_match_all("/(OLD¦)(sys log¥.log)/",$filename, $matches); SECOND PATTERN | GENERATION MANAGEMENT TYPE |
| host02 Apache access_log (GROUP B) | host02:C:¥¥Program Files¥¥Apache Group¥¥Apache¥¥logs¥¥access_log(¥.[1-9]{0,1}) | preg_match_all("/(access_log)(¥.[1-9]{0,1})/",$filename, $matches); FIRST PATTERN | GENERATION MANAGEMENT TYPE |
| host03 event.csv (GROUP C) | host03: C:¥Documents and Settings¥¥user1¥¥My Documents¥event¥.csv | preg_match_all("/(event¥.cs v)/",$filename, $matches); FIRST PATTERN | DB TYPE |
| ... | | | |

Fig. 3

22: DIFFERENCE DETECTION DATA TABLE

| GROUP NAME | FILE PATH | OBJECT ID | PRODUCTION DATE/TIME | SIZE | CHECKSUM | DIFFERENCE DATA | REFERENCE |
|---|---|---|---|---|---|---|---|
| host01 syslog.log | host01:/var/ad m/syslog/syslo g.log | 7176224 | 2007.2.1 13:01:01 | 2048BYTES | | | POSSIBLE |
| host02 Apache access_log | hosy02:C:¥Pro gram Files¥Apache Group¥Apach e¥logs¥access _log.1 | | 2007.2.1 13:01:01 | 2048BYTES | | | POSSIBLE |
| host01 syslog_log | host01:/var/ad m/syslog/syslo g.log | 7176224 | 2007.1.1 13:01:01 | 2048BYTES | | | IMPOSSIBLE |

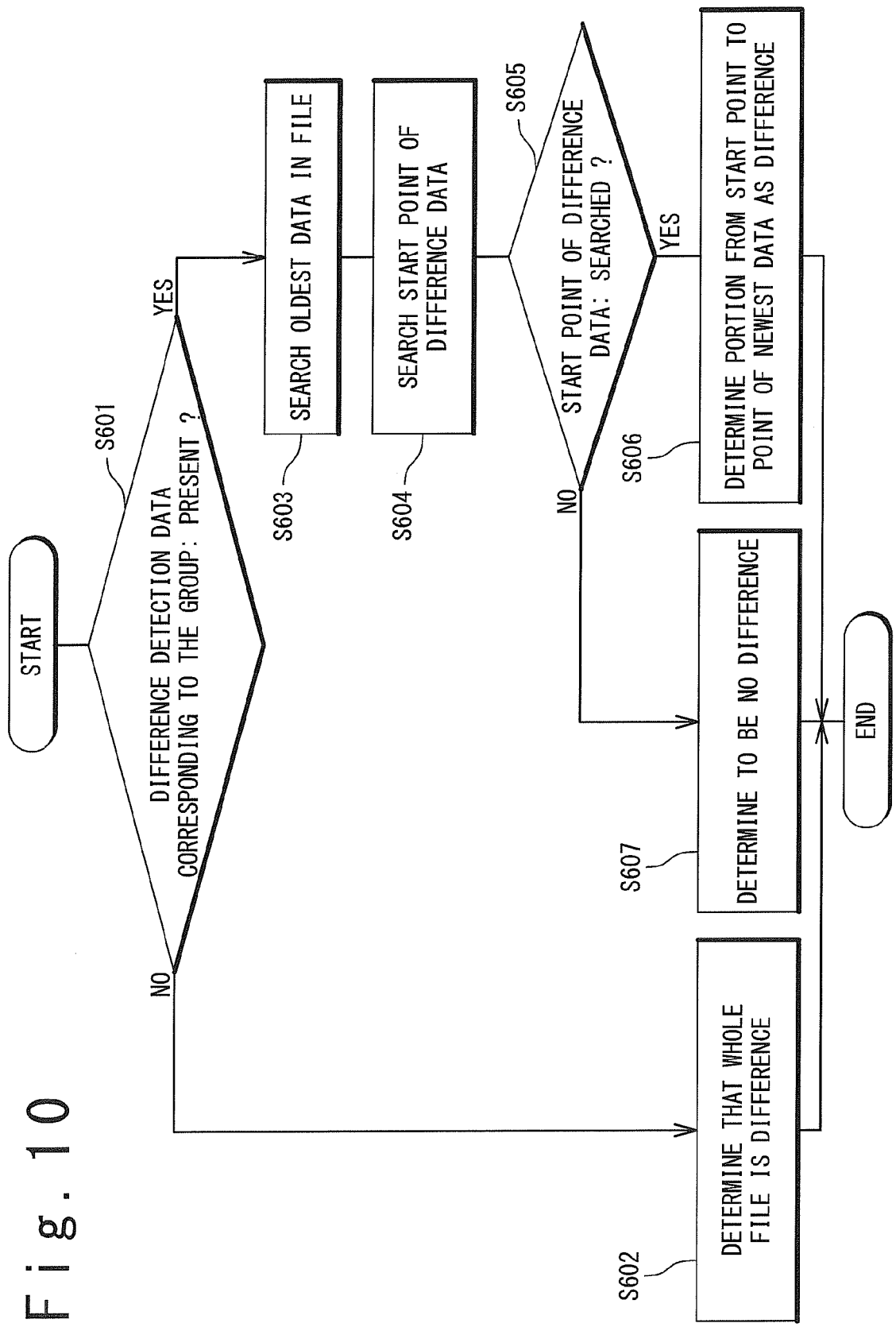

APPARATUS AND METHOD FOR FILE DIFFERENCE MANAGEMENT

INCORPORATION BY REFERENCE

This application claims a priority on convention based on Japanese Patent Application No. 2007-213106 filed on Aug. 17, 2007. The disclosure thereof is incorporated herein by reference.

TECHNICAL FIELD

The present invention relates to a file difference management apparatus and a file difference management method, in which an update state of a file is managed based on a difference data before and after the file is updated.

BACKGROUND ART

In a computer, it is possible to recover a file that is lost by a human error, a physical failure, or infection of a computer virus through a backup. Files are backed up periodically or non-periodically. Also, a backup system is known in which a generation management is performed such that not only a file previous to the backup but also a file previous to the previous file are saved.

In the file generation management, all the files over several generations are saved. Thus, when the number of generations increases, a storage capacity for backup becomes increased. Therefore, a difference management method has become spread, in which a difference between a previous backed-up file and a current backed-up file is detected, and the difference is recorded as a previous file data, in order to reduce the storage capacity for backup.

A data backup apparatus is disclosed in Japanese Patent Application Publication (JP-P2006-178645A). The data backup apparatus compares a previously backed-up file data and a currently backed-up file data under a same file name, determining a difference between these file data, and stores the difference as old generation backup data. Meanwhile, the currently backed-up file is stored as latest generation backup data. In this way, it is possible to suppress an increase in the storage capacity required for the backup, even if the number of generations of a file to be backed up becomes increased.

However, in a technique disclosed in Japanese Patent Application Publication (JP-P2006-178645A), the file difference management is performed to the files with a same file name. If a file has a different file name, the file is treated as a different file. Therefore, it is not possible to take out only the data that is simply added as a difference, in case of a file whose name is changed by using an event as a trigger, as in a system log of Linux, for example.

Further, the difference can be taken out only by comparing files, even if the file names are the same. Therefore, when comparing the files, it is necessary to keep all the file data in the previous difference detection (when backed up).

Further, in case of a file management method in which data are deleted in order from an oldest one so that the stored data does not exceed a specific size (e.g., a case of a file management method which utilizes timestamps to sort and take out data that having the timestamps from a database), positions of the same data on the files become shifted. Thus, when the contents thereof are simply compared, already taken out data may be detected as newly added data.

SUMMARY

It is therefore an object of the present invention to provide a file difference management apparatus, and a file difference management method, in which differences of files can be managed regardless of a change in a file name.

In an exemplary embodiment of the present invention, a file difference management apparatus includes a storage unit in which a group data table and a difference detection data table are stored; a difference data detection module configured to search a previous difference detection file which is an original file of an difference management object file and detect a difference between the previous difference detection file and the difference management object file; and a difference data management module configured to a difference detection data used to detect the difference in the difference detection data table. The difference data detection module selects a group to which the difference management object file belongs, based on a group condition registered on the group data table, extracts a first difference detection data related to the group from the difference detection data table, and detects the difference between the difference management object file and the previous difference detection file used for detection of the first difference detection data, based on a comparing result of the first difference detection data and a file data of the difference management object file. The difference data management module records the file data and the group related to each other as a second difference detection data on the difference detection data table, when the difference is detected.

In another exemplary embodiment of the present invention, a file difference management method is achieved by selecting a group to which a difference management object file belongs, based on a group condition registered on a group data table; by detecting a difference between a difference management object file and a previous difference detection file used for detection of a difference detection data, based on a comparing result of the difference detection data of the group and a file data of the difference management object file; and by recording the file data and the group related to each other as the difference detection data on the difference detection data table, when the difference is detected.

In still another exemplary embodiment of the present invention, a computer-readable software medium in which a program code is recorded for realizing a file difference management method. The file difference management method is achieved by selecting a group to which a difference management object file belongs, based on a group condition registered on a group data table; by detecting a difference between a difference management object file and a previous difference detection file used for detection of a difference detection data, based on a comparing result of the difference detection data of the group and a file data of the difference management object file; and by recording the file data and the group related to each other as the difference detection data on the difference detection data table, when the difference is detected.

In the file difference management apparatus, and the file difference management method, it is possible to manage the differences between the files regardless of a change in a file name.

BRIEF DESCRIPTION OF THE DRAWINGS

The above and other objects, advantages and features of the present invention will be more apparent from the following description of certain exemplary embodiments taken in conjunction with the accompanying drawings, in which:

FIG. 2 is a diagram showing a configuration of a group data table in the exemplary embodiment of the present invention;

FIG. 3 is a diagram showing a configuration of a difference detection data table in the exemplary embodiment of the present invention;

FIG. 10 is a flowchart showing an operation of the difference detection process for a database type or a recursive type executed in the file difference management apparatus in the exemplary embodiment of the present invention.

EXEMPLARY EMBODIMENTS

Figure 1:
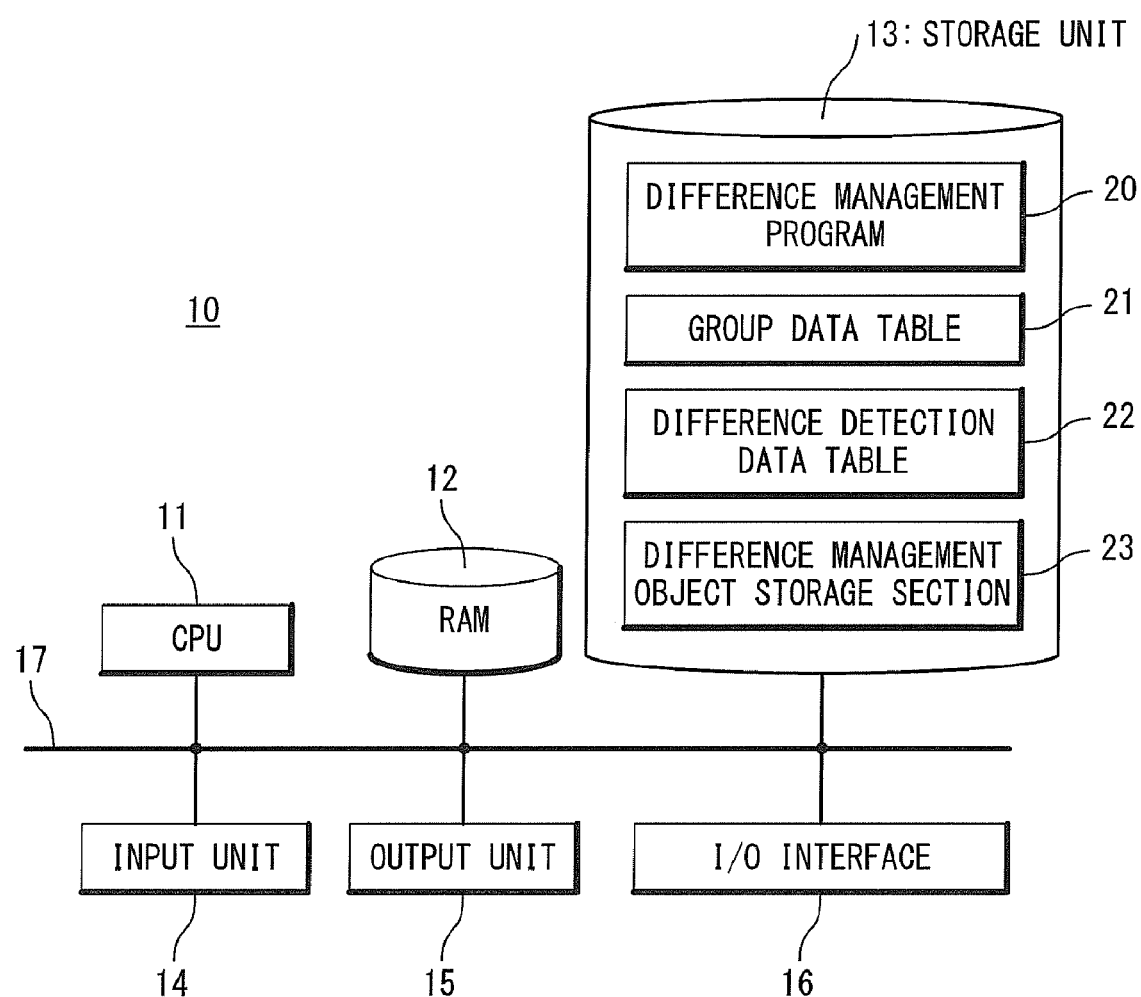
FIG. 1 is a diagram showing a configuration of a file difference management apparatus according to an exemplary embodiment of the present invention.

Hereinafter, a file difference management apparatus according to the present invention will be described with reference to the attached drawings. The file difference management apparatus manages files of three types such as a generation management type, a database type (DB type), and a recursive type as object files for difference management.

A generation management file means a file in a system log of UNIX (registered trademark). In this type of file, generation of the file that log is written is changed when a certain event has occurred (e.g., rebooting of a server, change of file size, and time), and the file that the log has been written is managed as a file of previous generation. There is a case that a name of the file of previous generation is changed when the generation of the file is changed becomes changed (e.g., a system log of Free BSD (Free Berkeley Software Distribution)). Further, when the number of generations of the file to be managed is set in advance, a data of the oldest generation may be deleted so that the number of generations does not exceeds an upper limit. Furthermore, there are also a case that the number of generations to be managed is unlimited, and a case that the number of generations is defined with terms.

For example, a file "host01:/var/adm/syslog/OLDsyslog.log" and a file "host01:/var/adm/syslog/syslog.log" of "the generation management type" are management objects, and it is assumed that the file "host01:/var/adm/syslog/syslog.log" is a current access file in which log is currently written. The file is changed in occurrence of an event such as rebooting of a server, switching the server, or the like. At this time, the file name is changed from "host01:/var/adm/syslog/syslog.log" to "host01:/var/adm/syslog/OLDsyslog.log". When the number of generations is set to "1", the old file "host01:/var/adm/syslog/OLDsyslog.log" is deleted according to the change of the file.

A database type file means a file outputted when an event log of Windows (registered trademark) is saved in a CSV format. Data (not shown) stored in a database are sorted and outputted in order of timestamps as a file. That is, data in the database type of file has a timestamp. For example, when the data stored in the database are sorted and outputted in an ascending order, the data at a start point of the file is the oldest data, and the data at a last point of the file is the latest data. Also, there is a case that the data stored in the database is deleted based on a certain condition (e.g., the number of data stored in the database, a size of data stored in the database, or the timestamp of each data).

The recursive type file means a file in which a data is recursively outputted to a single file. "To output the data recursively" means that data are sequentially outputted to the file, a data output pointer is returned to a start point of the file when a certain condition (the number of data, a size of the file, or the like) is satisfied and the data are sequentially outputted from there. It should be noted that it is assumed that the data in the recursive type file have the timestamps. However, it is also objected in an even case that the data are not sorted in time series.

Exemplary Embodiment (Configuration)

FIG. 1 is a diagram showing a configuration of a file difference management apparatus 10 according to an exemplary embodiment of the present invention. Referring to FIG. 1, the configuration of the file difference management apparatus 10 in the exemplary embodiment will be described. The file difference management apparatus 10 in the exemplary embodiment includes a CPU 11, a RAM 12, a storage unit 13, an input unit 14, an output unit 15, and an I/O interface 16, which are connected to each other via a bus 17. The storage unit 13 is a hard disk, a memory, or the like. A difference management program is installed in the storage unit 13 from a software recording medium (not shown) such as a DVD disc. Further, the input unit 14 outputs various data to the CPU 11 and the storage unit 13 through an operation of a keyboard, a mouse, and the like by a user. The output unit 15 may be a monitor or a printer, for example, and outputs a result of circuit analysis outputted from the CPU 11 in a form that can be visible by the user. The I/O interface 16 performs transmission and reception of data and signals with other computers and databases (not shown).

The CPU 11 performs a difference management program 20 stored in the storage unit 13 in response to an instruction from the input unit 14 to perform difference management of files. At this time, various kinds of data and programs from the storage unit 13 are stored in the RAM 12 temporarily, and the CPU 11 performs various kinds of processing by using the data stored in the RAM 12.

The storage unit 13 stores the difference management program 20, a group data table 21, and a difference detection data table 22. Further, the storage unit 13 has a difference management object storage section 23 as a storage area in which a file supplied via the I/O interface 16 as a difference management object is recorded.

FIG. 2 is a diagram showing an example of a configuration of the group data table 21. The group data table 21 is a table that stores group data 210 set by the user. The group data 210 is a data for defining a group to which the difference management object file belongs, and the data is identified according to a group name. In the group data table 21, the group data 210 is set in which a group condition, a fixed field of a file name, and a type of file are related to each other for each group name.

The group condition is a condition for the difference management object file to belong to that group. The group condition is preferable to be a conditional expression that uses a normal expression showing a path of the file. In this case, the difference management object file whose path fits to the conditional expression is determined as a file that belongs to the group corresponding to the group condition.

The file name fixed field defines the fixed field of the name of the file that belongs to the group. For example, when first and second patterns of "preg_match_all ("/([A-Za-z0-9]+)(¥.log)([1-9])/", $filename, $matches);" are set as the file name fixed field, the difference management object file whose file name fixed field is "*.log" (*.log) is determined to belong to a group corresponding to the file name fixed field (note here that * is a combination of alphanumeric characters).

Further, a "generation management type", a "database type", or a "recursive type" is set to the group data 210.

FIG. 3 is a diagram showing an example of a configuration of the difference detection data table 22. Data associated with the difference management object file that is already being managed by the difference management apparatus 10 (to be referred to as a previous difference detection file hereinafter) is recorded to the difference detection data table 22 as difference detection data 220. It should be noted that the previous difference detection file is the difference management object file that has previously been inputted to the difference management apparatus, and has the difference detection data 220 already detected and recorded. The difference detection data 220 contains a group name, a file path, an object identifier, a production date/time, size, checksum, and difference data 230 (data for detecting a difference start point), which correspond to the previous difference detection file. Further, a reference availability flag is set in the difference detection data table 22, which determines whether or not the difference detection data 220 is referable.

The group name corresponds to a group name contained in the group data 210, which is data specifying the group of the managed file. The file path is a file name for specifying the previous difference detection file. The object identifier is an object identifier that is set to the previous difference detection file. The production date/time is a date and time at which the previous difference detection file is produced, and the size is the data size. The checksum is a checksum that is set to the previous difference detection file.

The difference management object storage section 23 is a storage area in which the difference management object file and the data associated with the difference management object file (a file path, an object identifier, a production date/time, a size, and a checksum) are recorded. A plurality of difference management object files (to be referred to as a difference management object file group 200, hereinafter) supplied via the I/O interface 16 periodically or non-periodically are recorded on the difference management object storage section 23.

Figure 4:
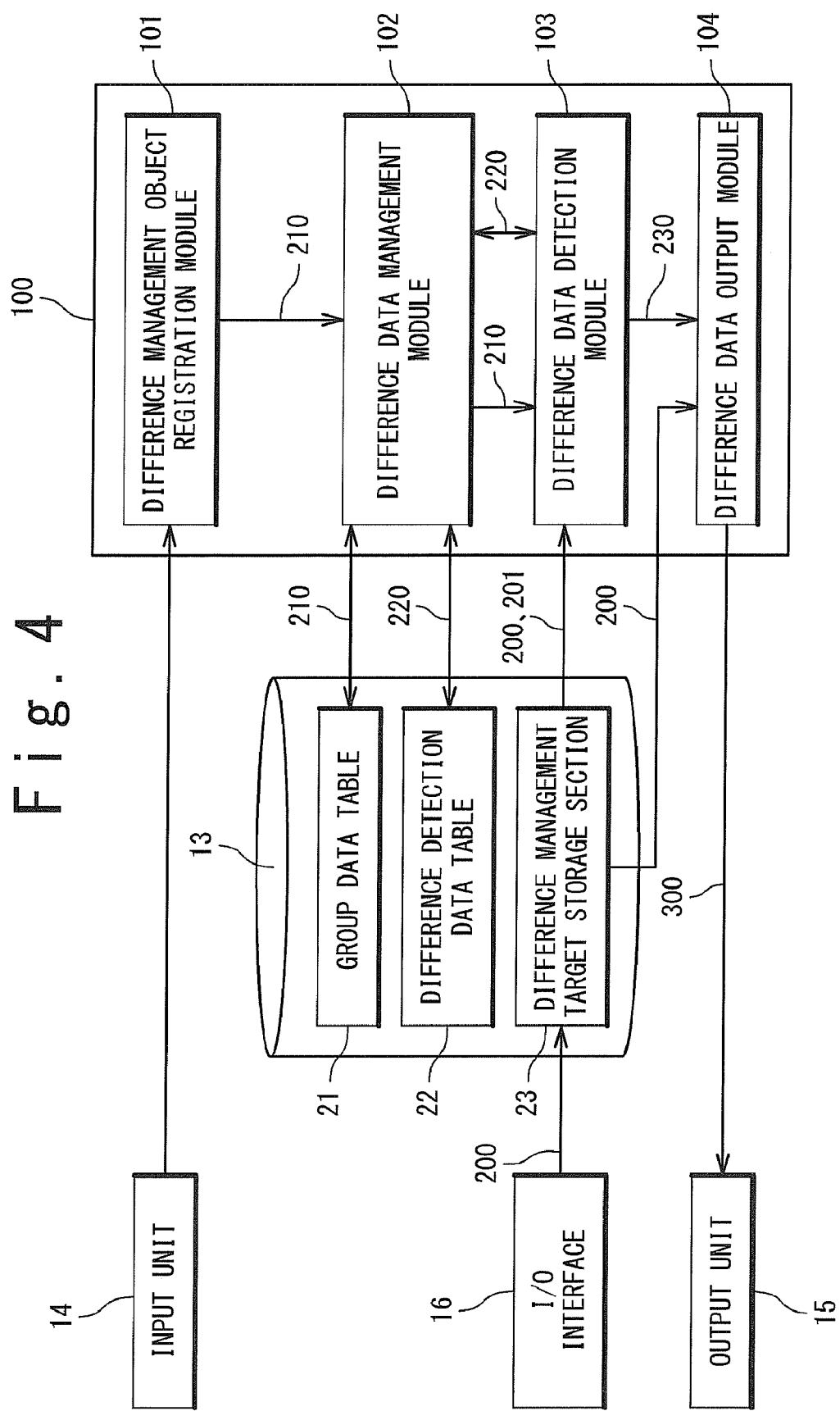
FIG. 4 is a functional block diagram showing a configuration of a difference management module in the exemplary embodiment of the present invention.

The CPU 11 achieves functions of the difference management module 100 shown in FIG. 4 by executing the difference management program 20. The difference management module 100 includes a difference management object registration module 101, a difference data management module 102, a difference data detection module 103, and a difference data output module 104. Roughly, each of these modules has following functions.

The difference management object registration module 101 has a function of producing the group data 210 that is necessary to divide the difference management object file group 200 into groups based on the data supplied from the input unit 14. The user outputs data (settings of the group condition, a type, the file name fixed field) to be included in the group data 210 to the difference management object registration module 101 by using the input unit 14. The difference management object registration module 101 has a function of producing the group data 210 from the supplied data, and giving it to the difference data management module 102.

The difference data management module 102 has a function of storing the group data 210 supplied from the difference management object registration module 101 into the difference detection data table 21, and a function of supplying the group data 210 and the difference detection data 220 to the difference data detection module 103. Further, the difference data management module 102 has a function of receiving a new difference detection data 220 that is produced by the difference data detection module 103, and storing it in the difference detection data table 22.

The difference data detection module 103 has a function of obtaining the group data 210 from the difference data management module 102, and dividing the difference management object files in the difference management object file group 200 into groups. Further, the difference data detection module 103 has a function of obtaining the difference detection data 220 from the difference data management module 102, and obtaining the difference management object file group 200 from the difference management object storage section 23 as well as the file data 210 for each of the difference management object files. The difference data detection module 103 produces the new difference detection data 220 that is necessary for next difference detection, based on the difference detection data 220 and the file data 201. The file data 201 contains a file path, a production date/time, an object identifier (Birth Object ID for Windows (registered trademark)), i-node for UNIX (registered trademark) and Linux, a file size, and the like on a machine (machine where writing to the file is performed) where the difference management object file is originally placed. The file data 201 may not have to contain the object identifier. The difference data detection module 103 has a function of obtaining position of difference data 300 by using the obtained difference management object file group 200, the difference detection data 220, and the file data 201, and outputting it to the difference data output module 104 as the difference data 230. It should be noted that the difference data 300 is a newly added data with respect to the previous difference management object file, among the whole data of the difference management object file. Further, the difference data 230 is a data showing positions (a start point and an end point) of the difference data 300 in the difference management object file. If the end point of the data in the difference management object file is known, the difference data 230 may not need to contain the data showing the end point of the difference data 300.

The difference data output module 104 has a function of reading the difference data from the difference management object file and outputting it to the output unit 15, based on the difference data 230 that is obtained from the difference data detection module 103.

(Operation)

Details of an operation (file difference management method) of the file difference management apparatus 10 according to the exemplary embodiment of the present invention will be described by referring to FIGS. 5 to 10.

(1) Set Group Data

Figure 5:
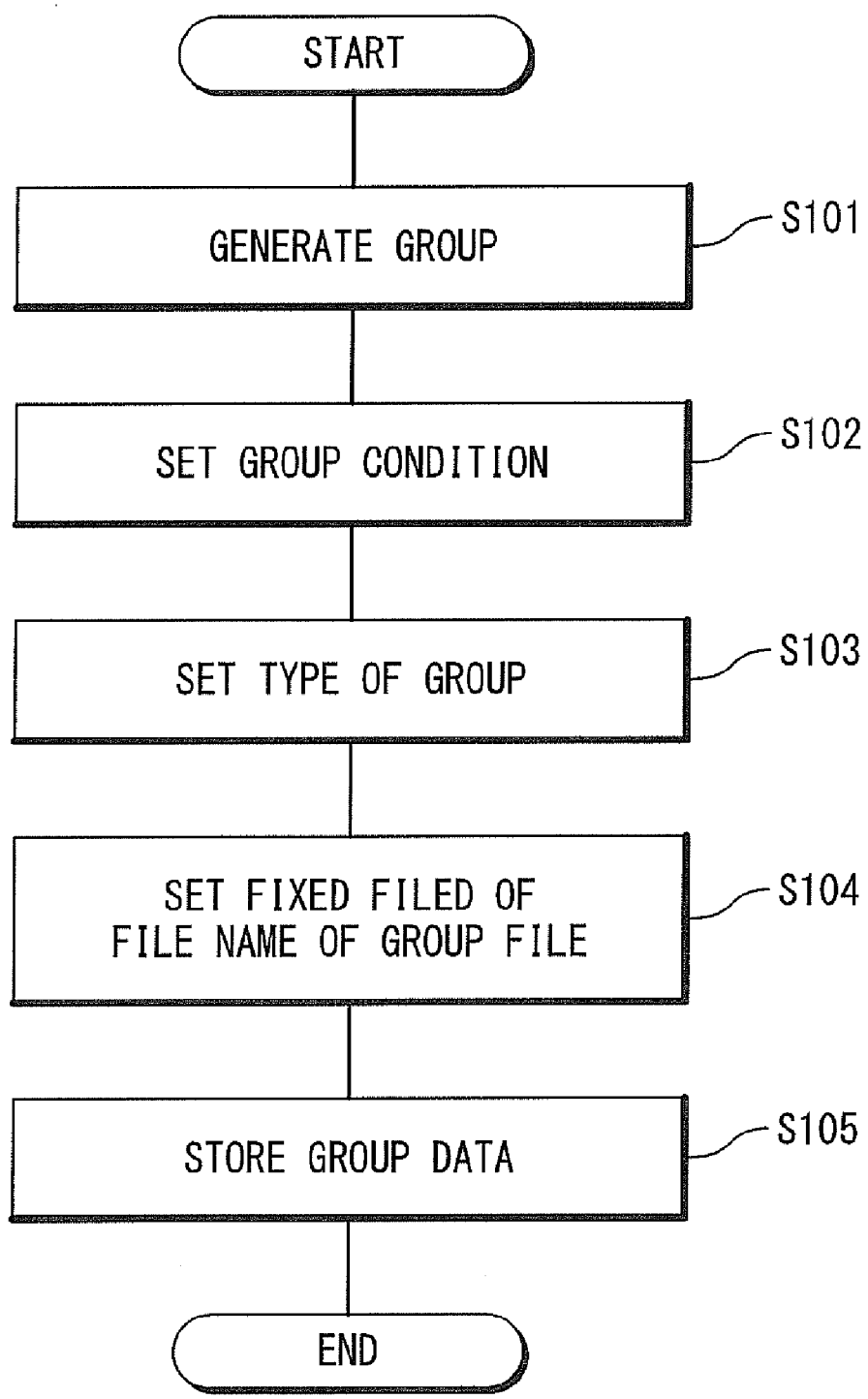
FIG. 5 is a flowchart showing an operation of a group registering process executed in the file difference management apparatus in the exemplary embodiment of the present invention.

In the file difference management apparatus 10 according to the present exemplary embodiment, the user sets the group data 210 to the group data table 21 before performing file management. FIG. 5 is a flowchart diagram showing an operation for setting the group data 210. Details of an operation of setting the group data 210 in the exemplary embodiment will be described by referring to FIGS. 2 to 5.

The difference management object registration module 101 produces group names for dividing the difference management object file group 200 into groups according to a designation data from the input unit 14 (step S101). Three groups of "host01 syslog.log", "host02 Apache access_log", and "host03 event.csv" are set herein as the group names. In the description provided hereinafter, the group specified by the group name "host01 syslog.log" is referred to as a group A, the group specified by the group name "host02 Apache access_log" is referred to as a group B, and the group specified by the group name "host03 event.csv" is referred to as a group C.

Next, the difference management object registration module 101 sets the group condition for each of the groups according to the designation data from the input unit 14 (step S102). Here, the normal expression "host01:¥/var¥/adm¥/syslog¥/(OLD|)syslog¥.log" is set for the group A, the normal expression "host02:C:¥¥Program Files¥¥Apache Group¥¥Apache¥¥logs¥¥access_log(¥.[1-9]{0, 1})" is set for the group B, and the normal expression "host03:C:¥¥Documents and Settings¥¥user1¥¥My Documents¥¥event¥.csv" is set for the group C.

In this case, for the file paths that fit to the group condition for the group A, there are "host01:/var/adm/syslog/OLDsyslog.log" and "host01:/var/adm/syslog/syslog.log". Oppositely, if the user desires to have "host01:/var/adm/syslog/OLDsyslog.log" and "host01:/var/adm/syslog/syslog.log" belong to the group A, the user may set the normal expression "host01:¥/var¥/adm¥/syslog¥/(OLD|)syslog ).log" that fits to those file paths as the group condition.

Similarly, as the group condition for the group B, the normal expression "host02:C:¥¥Program Files¥¥Apache Group¥¥Apache¥¥logs¥¥access_log(¥.[1-9]{0, 1})" is set for having "Program Files¥Apache Group¥Apache¥logs¥access_log", "Program Files¥Apache Group¥Apache¥logs¥access_log.1", "Program Files ¥Apache Group¥Apache¥logs¥access_log.2" in the C drive of the host 02 to belong to the group B.

As the group condition for the group C, the normal expression "host03:C:¥¥Documents and Settings ¥¥user1¥¥My Documents¥¥event¥.csv" is set for having "Documents and Settings¥¥User1¥¥My Documents ¥¥event¥.csv" in the C drive of the host 03 to belong to the group C.

Next, the difference management object registration module 101 sets a group type to each group in accordance with the designation data from the input unit 14 (step S103). Here, the group A is set as the generation management type, the group B is set as the generation management type, and the group C is set as the database type.

Next, the difference management object registration module 101 sets the file name fixed fields to the difference management object file belonging to each group in accordance with the designation data from the input unit 14 (step S104). Here, second patterns of "preg_match_all ("/(OLD|)(syslog¥.log)/", $filename, $matches);" and "preg_match_all (("/access_log)(¥. [1-9] {0, 1})/", $filename, $matches);" are set as the file name fixed field for the group A, a first pattern of "preg_match_all (("/access_log)(¥.[1-9] {0, 1})/", $filename, $matches);" is set as the file name fixed field for the group B, and a first pattern of "preg_match_all ("/event¥.csv)/", $filename, $matches);" is set as the file name fixed field for the group C.

As described above, the group data 210 associated with the groups A, B, and C is recorded on the group data table 21 by the difference data management module 102 (step S105). It should be noted that the order of settings executed at the steps S102 to S104 is not limited to the above-described orders.

As described above, the group data 210 as shown in FIG. 2 is registered in the group data table 21. When the group data 210 is registered, the difference data detection module 103 can obtain the difference management object file group 200 from the difference management object storage section 23 to detect differences.

(Detect Difference)

Figure 6:
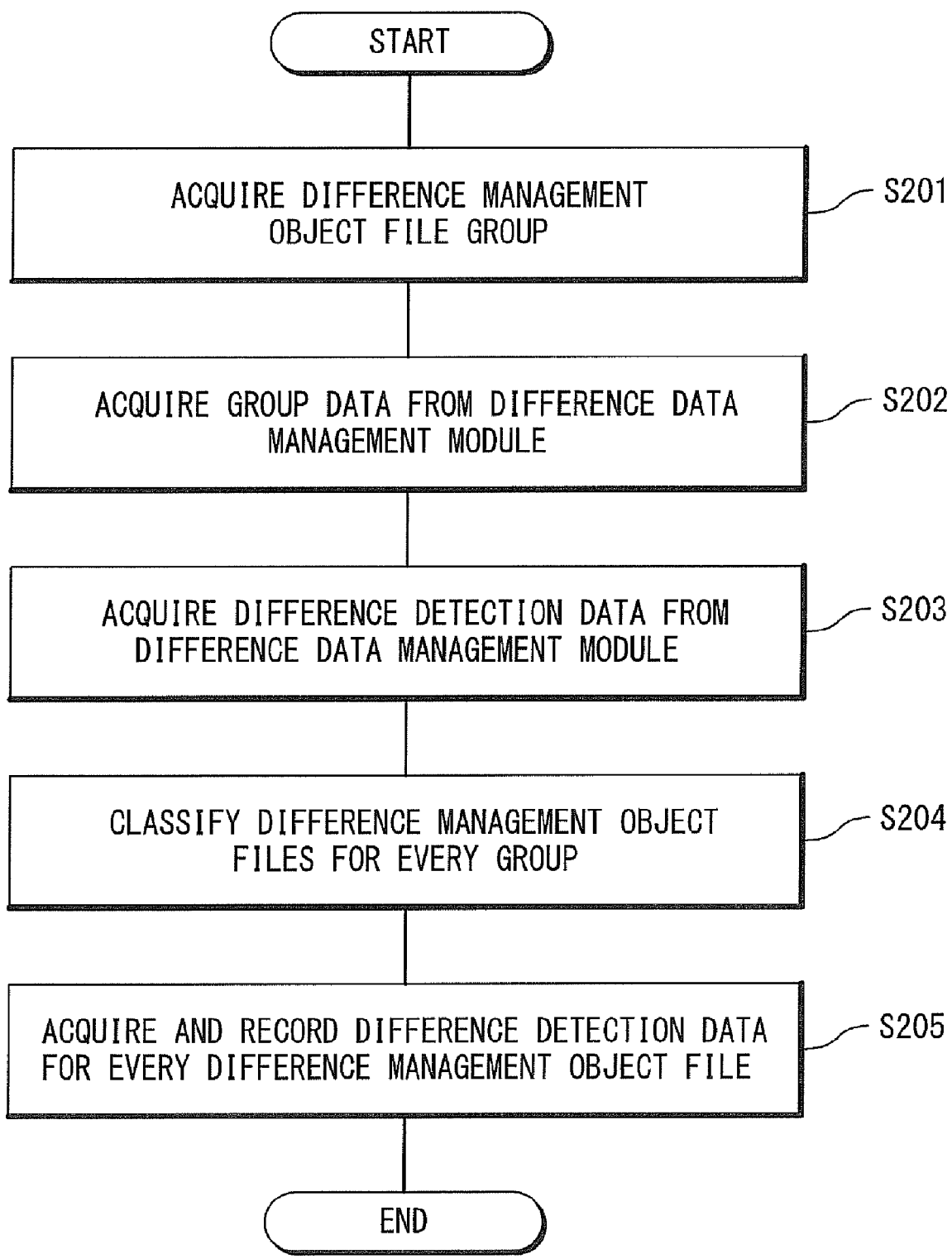
FIG. 6 is a flowchart showing the whole operation of a difference detection process executed in the file difference management apparatus in the exemplary embodiment of the present invention.

FIG. 6 is a flowchart showing an operation of the difference detection process according to the exemplary embodiment of the present invention. The outline of the difference detection process performed by the file difference management apparatus 10 will be described with reference to FIG. 6.

Upon receiving an instruction to detect a difference, the difference data detection module 103 obtains the difference management object file group 200 from the difference management object storage section 23 (step S201). At this time, the difference data detection module 103 also obtains the file data 201 for each of the difference management object files along with the difference management object file group 200. The instruction to detect a difference is issued periodically or according to some kinds of events (rebooting of a server, a change of a file size, and a time).

Next, the difference data detection module 103 obtains all the effective group data 210 from the difference data management module 102 (step S202). Here, the difference data detection module 103 obtains the group data 210 associated with the groups A, B, and C from the group data table 21 shown in FIG. 2. Then, the difference data detection module 103 obtains the difference detection data 220 from the difference data management module 102 (step S203). Here, the difference data detection module 103 obtains all the difference detection data 220 which are recorded and set to be referable in the difference detection data table 22. Further, the difference data detection module 103 divides the difference management object file group 200 into groups based on the file data 201 obtained at the step S201 and the group data 210 obtained at the step S202 (step S204). Here, when the file path contained in the file data 201 fits to the group condition contained in the group data, it is determined that the difference management object file corresponding to the file data 201 belongs to the group corresponding to the group condition.

By relating the difference management object file to the groups, it is possible to specify the difference detection data 220 and the file type (the generation management type, the database type or the recursive type) used in the difference detection process executed at a step S205. Upon classifying all the files of the difference management object file group 200 into groups, the difference data detection module 103 obtains new difference detection data 220 from the difference management object file having a difference to the previous difference management object file of the difference management object file group 200, and records it on the difference detection data table 22 by relating it to the group (step S205). At this time, the old difference detection data 220 of the same group (the difference detection data 220 corresponding to the previous difference detection file) is deleted, and a new difference detection data stored this time is set to be referable.

Next, details of the difference detection process executed in the file difference management apparatus 10 according to the present invention will be described with reference to FIGS. 6 to 9.

First, the details of the difference detection process for the generation management difference management object file will be described, which is performed in an initial state where the difference detection data 220 has not recoded on the difference detection data table 22.

The difference data detection module 103 obtains the difference management object file group 200 and the corresponding file data 201 in response to an instruction to execute the difference detection process (step S201). Here, the difference data detection module 103 obtains a single difference management object file (file data 201: file path="host01:/var/adm/syslog/syslog.log", production date/time="2007.1.1. 13:01:01", object identifier="7176224", file size="1024 bytes") as the difference management object file group 200.

Subsequently, the difference data detection module 103 obtains the group data 210 of the groups A, B, and C registered in the group data table 21 (step S202).

Since the difference detection data 220 has not recorded on the difference detection data table 22 in the initial state, the difference data detection module 103 obtains the difference detection data 220 indicating "no difference detection data" (step S203).

The difference data detection module 103 allocates the obtained difference management object file to a group based on the group data 21 (step S204). Here, the obtained difference management object file "host01:/var/adm/syslog/syslog.log" is related to the group A, since it fits to the group condition "host01:¥/var¥/adm¥/syslog¥/(OLD|)syslog¥.log" for the group A (group name:"host01 syslog.log").

The difference data detection module 103 executes the difference detection process on all the files in the obtained difference management object file group 200, and updates the difference detection data table 22 (step S205).

Figure 7:
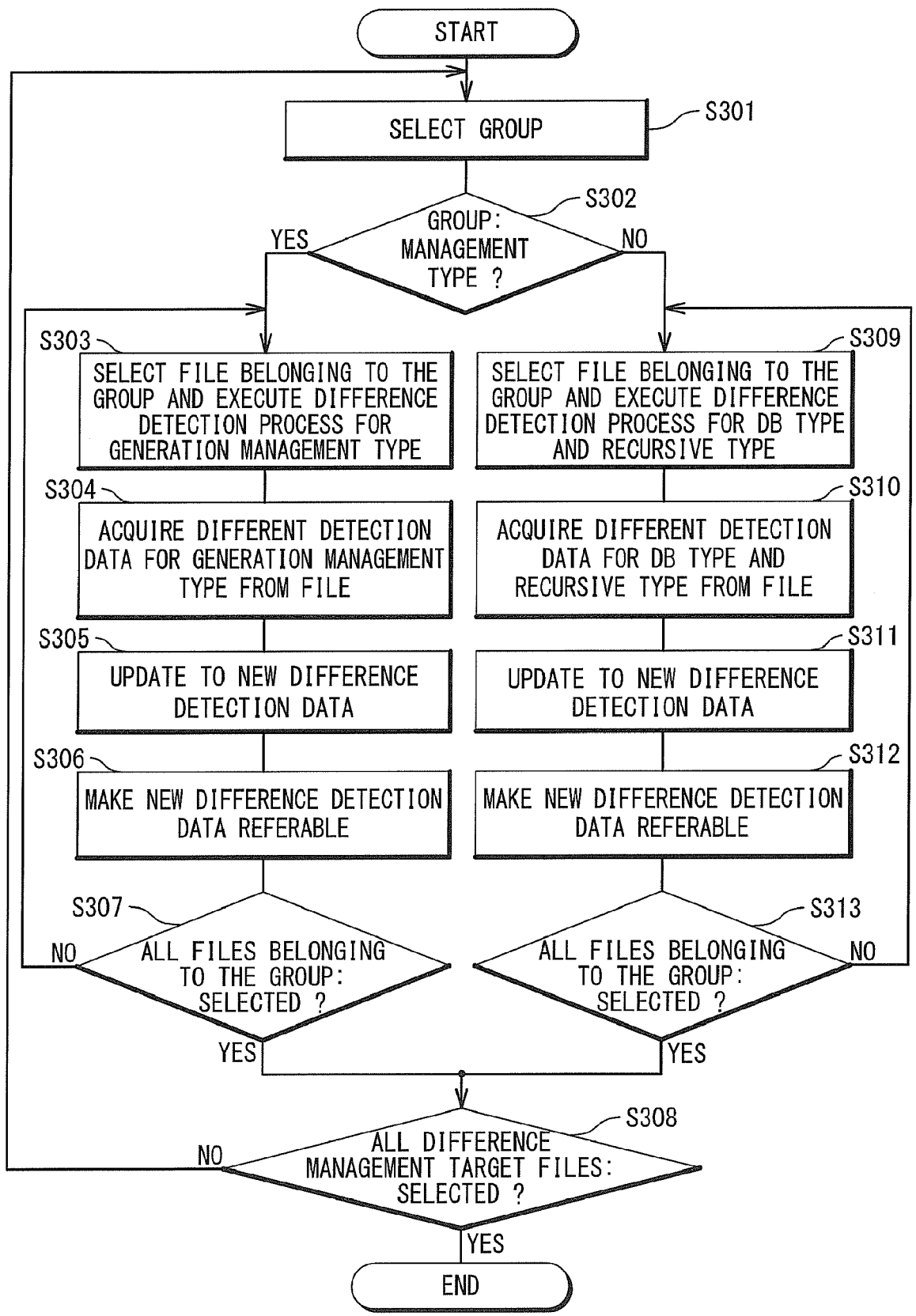
FIG. 7 is a flowchart showing an operation of a difference detection process executed in the file difference management apparatus in the exemplary embodiment of the present invention.

FIG. 7 is a flowchart showing an operation of the difference detection process executed at the step S205. Details of the difference detection process executed at the step S205 will be described with reference to FIG. 7.

First, the difference data detection module 103 selects a single group, and starts the difference detection process of the difference management object file that belongs to the group (step S301). Here, it is supposed that the group A is selected. Upon selecting the group, the difference data detection module 103 checks the type of the group (step S302). When the selected group is the "generation management type", the process flow advances to a step S303 (Yes at step S302). When the selected group is of the "database type" or of the "recursive type", the process flow advances to a step S309 (No at step S302).

Figure 8:
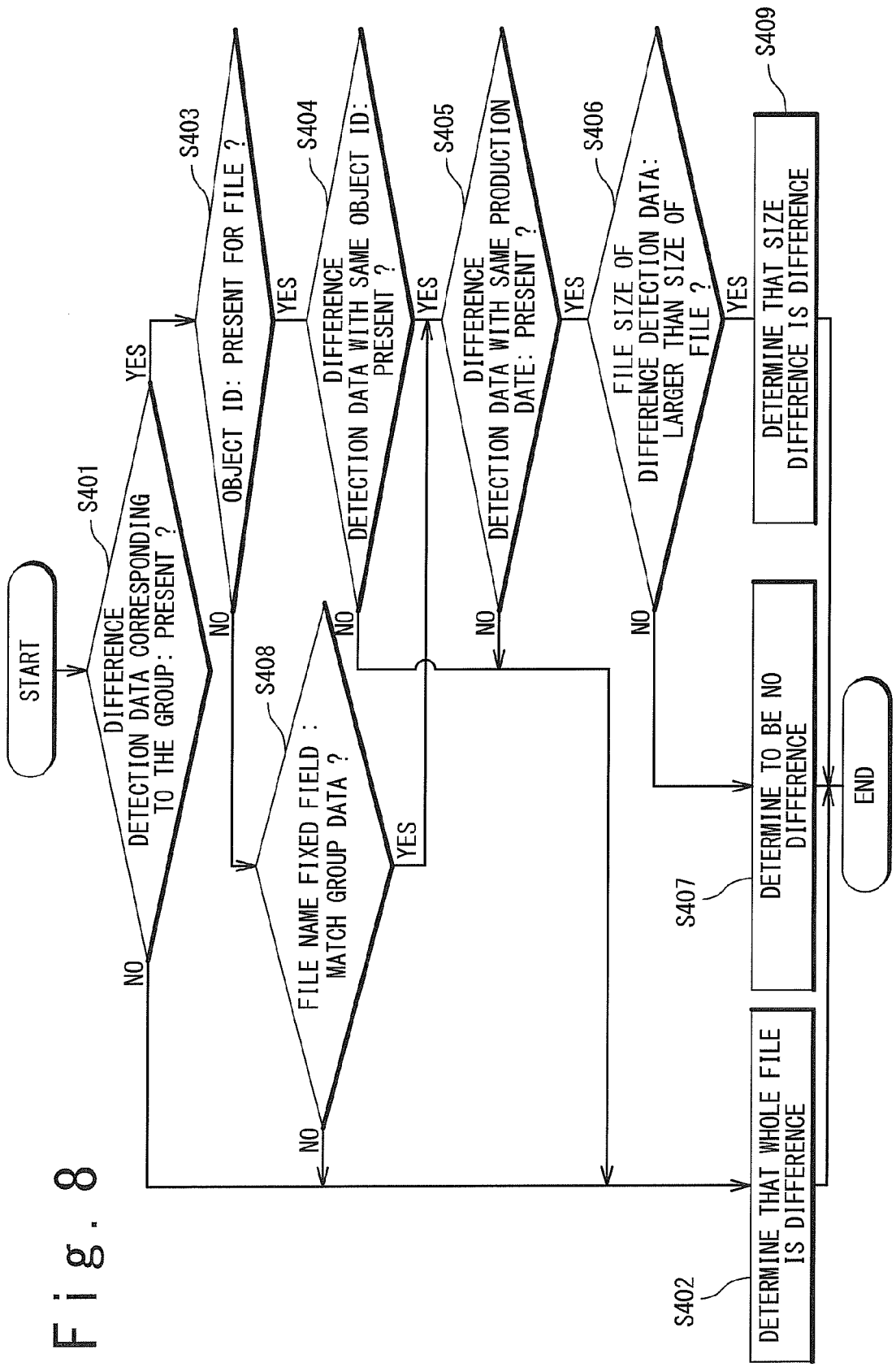
FIG. 8 is a flowchart showing an operation of the difference detection process for a generation management type executed in the file difference management apparatus in the exemplary embodiment of the present invention.

Since the group A is of the generation management type, the difference data detection module 103 selects the difference management object file belonging to the group A, and executes the difference detection process for the generation management type (step S303). Here, the difference management object file "host01:/var/adm/syslog/syslog.log" is selected. FIG. 8 shows the details of the difference detection process for the generation management type executed at the step S303.

Referring to FIG. 8, the difference data detection module 103 checks whether or not there is a previous difference detection file that belongs to the group selected at the step S301 (step S401). When there is found the previous difference detection file in the group, i.e., when the difference detection data 220 related to the group has already been recorded, the process flow advances to a step S403 (Yes at step S401). Meanwhile, when there is no previous difference detection file belonging to the group, i.e., when the difference detection data 220 related to the group has not yet been recorded, the difference data detection module 103 determines all the data of the difference management object file selected at the step S303 as the difference data 300 (step S402). At this time, the difference data detection module 103 obtains a start point and an end point of the data in the difference management object file as the difference data 230.

Here, since the first-time detection of the difference for the group A is performed, it is confirmed that there is no previous difference detection file. In this case, the whole data of the difference management object file "host01:/var/adm/syslog/syslog.log" is determined as new data, i.e., determined as the difference data 300 at the step S402. Further, the difference data detection module 103 obtains the difference data 203 that designates the start point and the end point of the data of the difference management object file "host01:/var/adm/syslog/syslog.log" as the start point and the end point of the difference data 300.

As described above, upon completion of the difference detection process at the step S303, the process flow advances to a step S304 shown in FIG. 7.

The difference data detection module 103 obtains the difference detection data 220 for the generation management type from the file data 201 that is obtained along with the difference management object file (step S304). More specifically, as the new difference detection data 220, the difference data detection module 103 obtains the file data 201, the difference data 230 that indicates a read position of the difference data 300, and the group to which the difference management object file belongs, by relating them to each other. Here, as the new difference detection data 220, the difference data detection module 103 obtains the file data 201 (file path="host01:/var/adm/syslog/syslog.log", production date/time="2007.1.1. 13:01:01", object identifier="7176224", file size="1024 bytes") of the difference management object file "host01:/var/adm/syslog/syslog.log", the difference data 230="start point: head of the file, end point=terminal point of the file", and the "group A" by relating them to each other. It should be noted that the file path is not essential to the difference detection data 220.

The difference data detection module 103 records the newly obtained difference detection data 220 on the difference detection data table 22 via the difference data management module 102 (step S305). At this time point, it is not possible to refer to the difference detection data recorded on the difference detection data table 22. Therefore, the difference data management module 102 sets the newly recorded difference detection data 220 to be referable (step S306).

Figure 9:
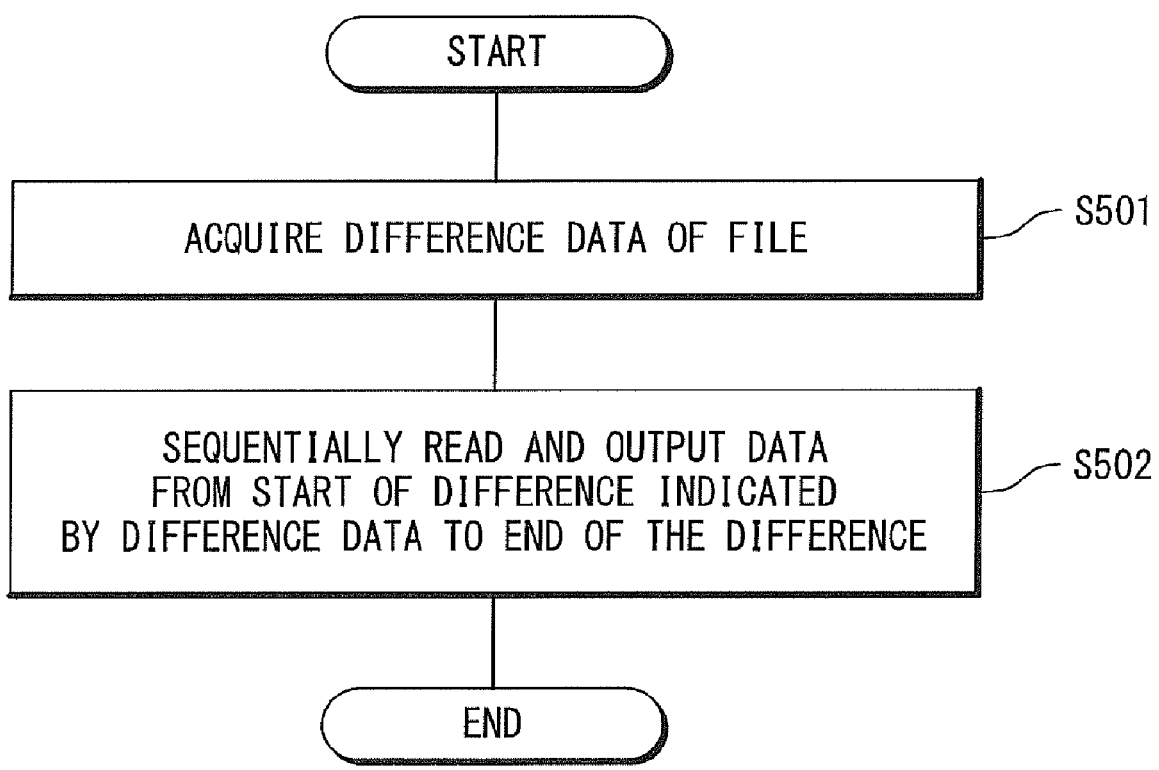
FIG. 9 is a flowchart showing an operation of a difference data output process executed in the file difference management apparatus in the exemplary embodiment of the present invention.

FIG. 9 shows details of an operation of the process executed at the step S306. Referring to FIG. 9, the difference data detection module 103 gives the obtained difference data 230 to the difference data output module 104 (step S501). The difference data output module 104 sequentially reads the data from the start point to the end point for a difference indicated by the difference data 230 from the difference management object file corresponding to the difference data 230, and outputs the read out data as the difference data 300 (step S502). Here, the whole data of the file "host01:/var/adm/syslog/syslog.log" is read and outputted to the output unit 15. At this time, the difference data management module 102 deletes the old difference detection data 220 (the difference detection data 220 of the previous difference detection file) corresponding to the group that is processed this time, and sets the difference detection data 220 that is stored newly this time to be referable. Here, since there is no difference detection data to be deleted, the difference detection data 220 (file path="host01:/var/adm/syslog/syslog.log", production date/time="2007.1.1. 13:01:01", object identifier="17176224", file size="1024 bytes", difference data 230="start point: head of the file, end point: terminal point of the file"), which is newly stored this time, is set to be referable.

The process at the steps S303 to S306 is executed for all the difference management object files that belong to the selected group (step S307). Upon completing the process of the steps S303 to S306 for all the difference management object files in the group, the process flow advances to a step S308 (Yes at step S307). At the step S308, it is confirmed to see whether or not the difference detection process has been executed for all the files in the difference management object file group 200. If it is found that there is an unselected difference management object file, the process advances to the step S301 at which the group to which that file belongs is selected, and the difference detection process is executed. In this manner, the difference detection process at the step S301 and the subsequent is performed for all the groups to which the obtained difference management object file group 200 belongs. Here, since the obtained difference management object file belongs only to the group A, the difference detection process is performed only for the difference management object file group 200 that belongs to the group A.

As described above, when the difference management object file of the generation management type is supplied in an initial state, the new difference detection data 220 is recorded (group name="host01 syslog.log", file path="host01:/var/adm/syslog/syslog.log", production date/time="2007.1.1. 13:01:01", object identifier="7176224", file size="1024 bytes", difference data 230="start point: head of the file, end point: terminal point of the file").

Next, a case will be described that an instruction is issued to the difference data detection module 103 so as to execute a new difference data detection process in a state that the above-described difference detection data 220 has been recorded on the difference data table 22.

The difference data detection module 103 obtains the difference management object file group 200 and the corresponding file data 201 in response to the instruction to execute the difference detection process (step S201). Here, the difference data detection module 103 obtains two difference management object files, i.e., the file (file data 201: file path="host01:/var/adm/syslog/OLDsyslog.log", production date/time="2007.1.1. 13:01:01", object identifier="7176224", file size="12048 bytes"), and the difference management object file (file data 201: file path="host01:/var/adm/syslog/syslog.log", production date/time="2007.2.1. 13:01:01", object identifier="7176225", file size="512 bytes") as the difference management object file group 200.

Subsequently, the difference data detection module 103 obtains the group data 210 of the groups A, B, and C registered in the group data table 21 (step S202).

The difference data management module 102 refers to the difference detection data table 22, and gives the already recorded difference detection data 220 (group name="host01 syslog.log", file path="host01:/var/adm/syslog/syslog.log", production date/time="2007.1.1. 13:01:01", object identifier="7176224", file size="1024 bytes", difference data 230="start point: head of the file, end point: terminal point of the file") to the difference data detection module 103 (step S203).

The difference data detection module 103 divides the obtained difference management object file group 200 into groups based on the group data 210 (step S204). Here, both of the obtained difference management object files "host01:/var/adm/syslog/syslog.log" and the file "host01:/var/adm/OLDsyslog/syslog.log" are related to the group A, since both the files fit to the group condition "host01:¥/var¥/adm¥/syslog¥/(OLD|)syslog¥.log" for the group A (group name: "host01 syslog.log").

The difference data detection module 103 executes the difference detection process on all the files within the obtained difference management object file group 200, and updates the difference detection data table 32 (step S205). Details of the difference detection processing executed at the step S205 will be described by referring to FIG. 7.

First, the difference data detection module 103 selects a single group, and starts the difference detection process of the difference management object file that belongs to the group (step S301). Here, it is supposed that the group A is selected. Upon selecting the group, the difference data detection module 103 checks the type of the group (step S302). When the selected group is the "generation management type", the process flow advances to the step S303 (Yes at step S302). When the selected group is the "database type" or the "recursive type", the process flow advances to the step S309 (No at step S302).

Since the group A is of the generation management type, the difference data detection module 103 selects the difference management object file belonging to the group A, and executes the difference detection process for the generation management type (step S303). Here, the difference management object file "host01:/var/adm/OLDsyslog/syslog.log" is selected first.

Details of the difference detection process executed in the step S303 will be described with reference to FIG. 8. The difference data detection module 103 checks whether or not there is the previous difference detection file that belongs to the group selected at the step S301 (step S401). Here, it is confirmed that there is the difference detection data 220 (file path="host01:/var/adm/syslog/syslog.log", production date/time="2007.1.1. 13:01:01", object identifier="7176224", file size="1024 bytes", difference data 230="start point: head of the file, end point: terminal point of the file"), which corresponds to the previous difference detection file of the group A. Therefore, the difference data detection module 103 advances to a step S403.

The difference data detection module 103 checks whether or not there is an object identifier in the file data 201 of the difference management object file (step S403). When there is no object identifier in the file data 201, the process flow advances to a step S408 (No at step S403). Meanwhile, when there is an object identifier in the file data 201, the difference data detection module 103 checks whether or not the difference detection data 220 having the object identifier corresponding to the found object identifier has been recorded (Yes at step S403, step S404). Here, it is confirmed that there is an object identifier in the file data 201 of the difference management object file "host01:/var/adm/OLDsyslog/syslog.log". Further, it is confirmed that the object identifier (="7176224") contained in the file data 201 matches the object identifier (="7176264") contained in the difference detection data 220 (corresponding to the previous difference detection file "host01:/var/adm/syslog/syslog.log").

When there is the difference detection data 220 having the object identifier that matches the object identifier in the file 201 at the step S404, the difference data detection module 405 checks whether or not, in the difference detection data 220 having the matching object identifier, there is the difference detection data 220 having the production date/time that matches the production date/time contained in the file data

201 (step S405). Here, it is confirmed that the production date/time (="2007.1.1. 13:01:01") that is contained in the file data 201 matches the production date/time (="2007.1.1. 13:01:01") of the difference detection data 220 (corresponding to the previous difference detection file "host01:/var/adm/syslog/syslog.log").

When the file data 201 does not have the file production date/time, a comparing process of the production date/time at the step S405 is not executed. In that case, the following comparing process may be executed.

The difference data detection module 103 compares checksums contained in the file data 201 and the difference detection data 220. If the checksums match to each other, the difference data detection module 103 compares the contents thereof. Comparison of the checksums may not have to be made on the whole file. It may be sufficient to make the comparison on the checksums of the size of the previous difference detection file at the most.

When the difference management object file in the difference management object file group 200 has been opened or hardlinked, a same i-node is not used for that generated file even if the file is deleted and another file is generated immediately. In such a case, the difference data detection module 103 can determine whether or not the files are the same by comparing only the object identifiers (i-nodes). That is, in such a case, the comparing process of the production date/time executed at the step S405 can be omitted. A period necessary to have the difference management object file opened or hardlinked is until the difference management module 100 detects a deletion of the file. In other words, the period necessary to have the difference management object file opened or hardlinked is a period from a time point right before the last difference detection for that file is performed to a time point where a next difference detection is performed after the file is deleted. However, there is no problem even if the period is longer than that.

In a group that the difference management is performed only for a file of a $0^{th}$ generation in terms of data update of the file, it is preferable to use an update date/time of the file data as a comparison object when a difference management object file other than the $0^{th}$ generation file is compared to a previous difference detection file other than the $0^{th}$ generation. Further, when a difference management object file of the $0^{th}$ generation file is compared to a previous difference detection file of the $0^{th}$ generation, it is preferable to use the checksums as a comparison object, or to have the files opened or hardlinked so that the difference management object file of the $0^{th}$ generation file and the previous difference detection file of the $0^{th}$ generation have different object identifiers (i-nodes), and compare only the object identifiers (i-nodes). However, the file names are used to determine whether or not the files are of $0^{th}$ generation.

Subsequently, as a result of the steps S404 and S405, when there is the difference detection data 220 having the object identifier and production date/time matching those of the file data 201, the difference data detection module 103 compares the data size of the file in the file data 201 and the data size contained in the difference detection data 220 (step S406). With this, the sizes of the difference management object file and the previous difference detection file, which have the consistent object identifiers and the production date/time, can be compared. When it is found at the step S406 that a size of the difference management object file is equal to or smaller than a size of the previous difference detection file, it is determined that there is no difference (step S407). In this case, the difference detection data 220 is not updated. Meanwhile, at the step S406, when the size of the difference management object file is larger than the size of the previous difference detection file, the data of the size difference is determined as the difference data 300. In this case, the difference data detection module 103 obtains the difference data that designates next data from the terminal point of the previous difference detection file as a start point and designates the terminal point of the difference management object file as a terminal point of the data. Here, a size (="2048 bytes") of the difference management object file "host01:/var/adm/OLDsyslog/syslog.log" is compared to the size (=1024 bytes) of the previous difference detection file "host01:/var/adm/syslog/syslog.log". Since the size of the difference management object file "host01:/var/adm/OLDsyslog/syslog.log" is larger by "1024 bytes", it is determined that the data from a position forward by 1024 bytes from the start point of the difference management object file to the terminal point of the file as the difference data 300. Further, the difference data detection module 103 obtains the difference data 230 that designates a $1025^{th}$ byte of the difference management object file "host01:/var/adm/OLDsyslog/syslog.log" as the start point of the difference data 300 and designates the terminal point thereof as the terminal point of the difference data 300.

Meanwhile, when there is no difference detection data 220 having an object identifier that matches the object identifier in the file 201 at the step S404 or there is no difference detection data 220 having a production date/time that matches the production date/time in the file 201 at the step S405, it is determined that the whole data of the selected difference management object file is new data, i.e., the whole data is the difference data 300 (step S402). At this time, the difference data detection module 103 obtains the difference data 230 that designates the start point and the end point of the data of the difference management object file as the start point and the end point of the difference data 300.

As described above, upon completion of the difference detection process executed at the step S303, the process flow advances to the step S304 shown in FIG. 7.

The difference data detection module 103 obtains the difference detection data 220 for the generation management type from the file data 201 that is obtained along with the difference management object file (step S304). Here, as the new difference detection data 220, the difference data detection module 103 obtains the file data 201 (file path="host01:/var/adm/syslog/OLDsyslog.log", production date/time="2007.1.1. 13:01:01", object identifier="7176224", file size="2048 bytes") of the difference management object file "host01:/var/adm/syslog/OLDsyslog.log", the difference data 230="start point: $1025^{th}$ byte from the head of the file, end point=terminal point of the file", and "group A" by relating to each other. It should be noted that the file path is not essential to the difference detection data 220.

The difference data detection module 103 records the newly obtained difference detection data 220 to the difference detection data table 22 via the difference data management module 102 (step S305). Here, (file name="host01 syslog.log", file path="host01:/var/adm/syslog/OLDsyslog.log", production date/time="2007.1.1. 13:01:01", object identifier="7176224", file size="2048 bytes", the difference data 230="start point: $1025^{th}$ byte from the head of the file, end point=terminal point of the file") is recorded as the new difference detection data 220. At this point, it is not possible to refer to the difference detection data recorded on the difference detection data table 22. Therefore, the difference data management module 102 sets the newly recorded difference detection data 220 to be referable (step S306).

Referring to FIG. 9, the difference data detection module 103 gives the obtained difference data 230 to the difference data output module 104 (step S501). The difference data output module 104 sequentially reads the data from the start point to the end point of the difference indicated by the difference data 230 from the difference management object file corresponding to the difference data 230, and outputs the read out data as the difference data 300 (step S502). Here, the data from the $1025^{th}$ byte of the difference management object file "host01:/var/adm/syslog/OLDsyslog.log" to the terminal point ($2048^{th}$ byte) is sequentially read by referring to the difference data 230, and the readout data is outputted to the output unit 15. At this time, the difference data management module 102 deletes the old difference detection data 220 (the difference detection data 220 of the previous difference detection file) corresponding to the group that is a current process object, and sets the difference detection data 220 that is stored newly at this time to be referable. Here, the new difference detection data 220 (file name="host01 syslog.log", file path="host01:/var/adm/syslog/OLDsyslog.log", production date/time="2007.1.1. 13:01:01", object identifier="7176224", file size="2048 bytes", difference data 230="start point: $1025^{th}$ byte from the head of the file, end point: terminal point of the file"), which is newly stored, is set to be referable.

In the difference management object file group 200, if there is a difference management object file that belongs to the A group and is not subjected to the difference detection, the process flow advances to the step S303 (No at step S307). At the step S303, a next difference management object file is selected, and the difference detection process for the generation management type is executed thereon. Here, the difference management object file "host01:/var/adm/syslog/syslog.log" (file data 201: file path="host01:/var/adm/syslog/syslog.log", production date/time="2007.2.1. 13:01:01", object identifier="7176225", file size="512 bytes") is selected.

Details of the difference detection process executed at the step S303 will be described by referring to FIG. 8. The difference data detection module 103 checks whether or not there is the previous difference detection file that belongs to the group selected at the step S301 (step S401). Here, it is confirmed that there is the difference detection data 220 (file path="host01:/var/adm/syslog/OLDsyslog.log", production date/time="2007.1.1. 13:01:01", object identifier="7176224", file size="2048 bytes", difference data 230="start point=$1025^{th}$ byte from the start point head of the file, end point: terminal point of the file"), which corresponds to the previous difference detection file of the group A. Therefore, the difference data detection module 103 advances to the step S403.

The difference data detection module 103 checks whether or not there is an object identifier in the file data 201 of the difference management object file (step S403). Here, it is confirmed that there is an object identifier in the file data 201 of the difference management object file "host01:/var/adm/syslog/syslog.log" (Yes at step S403). Subsequently, it is confirmed that the difference detection data 220 having an identifier that matches the object identifier (="7176225") contained in the file data 201 has not been recorded on the difference detection data table 22 (No at step S404).

Since there is no difference detection data 220 having the object identifier that matches the object identifier contained in the file data 201, the difference data detection module 103 determines that the whole difference management object file "host01:/var/adm/syslog/syslog.log" is the difference data 300 (step S402). Further, the difference data detection module 103 obtains the difference data 230 that designates the start point and the terminal point of the data of the difference management object file "host01:/var/adm/syslog/syslog.log" as the start point and the end point of the difference data 300.

As described above, upon completion of the difference detection process executed at the step S303, the process flow advances to the step S304 shown in FIG. 7.

The difference data detection module 103 obtains the difference detection data 220 for the generation management type from the file data 201 that is obtained along with the difference management object file (step S304). Here, as the new difference detection data 220, the difference data detection module 103 obtains the file data 201 (file path="host01:/var/adm/syslog/syslog.log", production date/time="2007.2.1. 13:01:01", object identifier="7176225", file size="512 bytes") of the difference management object file "host01:/var/adm/syslog/syslog.log", the difference data 230="start point: head of the file, end point=terminal point of the file", and the group A by relating them to each other. Here, the file path is not essential as the difference detection data 220.

The difference data detection module 103 records the newly obtained difference detection data 220 on the difference detection data table 22 via the difference data management module 102 (step S305). The difference data detection module 103 gives the obtained difference data 230 to the difference data output module 104. The difference data output module 104 sequentially reads the data from the start point to the end point of the difference indicated by the difference data 230 from the difference management object file that corresponds to the difference data 230, and outputs the read out data as the difference data 300. Here, the whole data of the file "host01:/var/adm/syslog/syslog.log" is read, and the read out data is outputted to the output unit 15. In this case, the difference data management module 102 sets the file data 201 (file path="host01:/var/adm/syslog/syslog.log", production date/time="2007.2.1. 13:01:01", object identifier="7176225", file size="512 bytes", difference data 230="start point: head of the file, end point: terminal point of the file") of the difference detection data 220 (file path="host01:/var/adm/syslog/syslog.log") which is newly stored this time to be referable.

The process of the steps S303 to S306 is executed for all the difference management object files that belong to the selected group (step S307). Upon completion of the steps S303 to S306 for all the difference management object files in the group, the process flow advances to the step S308 (Yes at step S307). In the step S308, it is checked to see whether or not the difference detection process has been executed for all the files in the difference management object file group 200. If it is found that there is an unselected difference management object file, the process flow advances to the step S301 where the group to which that file belongs is selected, and the difference detection process is executed. In this manner, the difference detection step S301 and continued thereafter is performed for all the groups to which the obtained difference management object file group 200 belongs. Here, since the obtained difference management object file belongs only to the group A, the difference detection process is executed only for the difference management object file group 200 that belongs to the group A.

As described above, the difference detection data 220 (file path="host01:/var/adm/syslog/syslog.log", production date/time="2007.1.1. 13:01:01", object identifier="7176224", file size="1024 bytes", difference data 230="start point=head of the file, end point: terminal point of the file"), which has been recorded previously as the difference detection data 220 corresponding to the group A is deleted, while the difference detection data 220 (file path="host01:/var/adm/syslog/OLDsyslog.log", production date/time="2007.1.1. 13:01:01", object identifier="7176224", file size="2048 bytes", difference data 230="start point=1025$^{th}$ byte from the head of the file, end point: terminal point of the file") and the difference detection data 220 (file path="host01:/var/adm/syslog/syslog.log", production date/time="2007.2.1. 13:01:01", object identifier="7176225", file size="512 bytes" difference data 230="start point=head of the file, end point: terminal point of the file") are recorded as the new difference detection data 220 corresponding to the group A.

As described above, the present invention determines whether or not an original file (before change or no change) of the inputted difference management object file is the previous difference detection file (determination of whether the difference management object file and the previous difference detection file are same) according to a combination of the file paths, object identifiers, the production date/time, and the like. Therefore, it is possible to determine whether or not those files are same, even if the file names are changed.

Further, the present invention compares the sizes of the files that are determined to be same to detect a difference between the file before update and the file after the update. This makes it possible to detect a difference in the file to which the output for the file is added without comparing contents thereof.

Next, details of the difference detection process for a difference management object file having no object identifier will be described. Here, it is assumed that the difference detection data 220 (group name="host02 Apache access_log, file path="host02:C:¥Program Files¥Apache Group¥Apache¥logs¥access_log.1", production date/time "2007.2.1. 13:01:01, object identifier=none, file size=512 bytes") and the difference detection data 220 (group name="host02 Apache access_log, file path=host02:C:¥Program Files¥Apache Group ¥Apache¥logs¥access_log", production date/time "2007.3.1. 13:01:01, object identifier=none, file size=1024 bytes") have been recorded to the difference detection data table 22.

The difference data detection module 103 obtains the difference management object file group 200 and the corresponding file data 201 in response to an instruction to execute the difference detection process (step S201). Here, the difference data detection module 103 obtains two difference management object files, i.e., the file (file data 201: file path="host02:C:¥Program Files¥Apache Group¥Apache¥logs ¥access_log.1", production date/time "2007.2.1. 13:01:01, object identifier=none, file size=512 bytes") and the difference management object file (file data 201: file path="host02:C:¥Program Files¥Apache Group¥Apache¥logs¥access_log", production date/time "2007.3.1. 13:01:01, object identifier=none, file size=2048 bytes") as the difference management object file group 200.

Subsequently, the difference data detection module 103 obtains the group data of the groups A, B, and C registered in the group data table 21 (step S202).

The difference data management module 102 refers to the difference detection data table 22, and gives the already recorded difference detection data 220 (group name="host02 Apache access_log", file path="host02:C:¥Program Files¥Apache Group¥Apache¥logs¥access_log.1", production date/time="2007.2.1. 13:01:01", object identifier="none", file size="512 bytes", difference data 230="start point: head of the file, end point: terminal point of the file") and the difference detection data 220 (group name="host02 Apache access_log", file path="host02:C: ¥Program Files¥Apache Group¥Apache¥logs¥access_log", production date/time="2007.3.1. 13:01:01", object identifier="none", file size="1024 bytes", difference data 230="start point: head of the file, end point: terminal point of the file") to the difference data detection module 103 (step S203).

The difference data detection module 103 divides the obtained difference management object file group 200 into groups based on the group data 210 (step S204). Here, both of the obtained difference management object files "host02:C: ¥Program Files¥Apache Group¥Apache¥logs¥access_log.1" and "host02:C:¥Program Files¥Apache Group¥Apache¥logs¥access_log" are related to the group B, since both files fit to the group condition "host02:C:¥¥Program Files¥¥Apache Group¥¥Apache¥¥logs¥¥access_log (¥.[1-9]{0,1})" for the group B (group name: "host02 Apache access_log").

The difference data detection module 103 executes the difference detection process on all the files in the obtained difference management object file group 200, and updates the difference detection data table 22 (step S205). Details of the difference detection process executed at the step S205 will be described with reference to FIG. 7.

First, the difference data detection module 103 selects a single group, and starts the difference detection process of the difference management object file that belongs to the group (step S301). Here, the group B is selected. Upon selecting the group B, the difference data detection module 103 checks the type of the group (step S302).

Since the group B is of the generation management type, the difference data detection module 103 selects the difference management object file belonging to the group B, and executes the difference detection process for the generation management type (step S303). Here, the difference management object file "host02:C:¥Program Files¥Apache Group¥Apache¥logs¥access_log.1" is selected first.

Details of the difference detection process executed at the step S303 will be described by referring to FIG. 8. The difference data detection module 103 checks whether or not there is a previous difference detection file that belongs to the group selected at the step S301 (step S401). Here, it is confirmed that there are the difference detection data 220 (group name="host02 Apache access_log, file path="host02:C: ¥Program Files¥Apache Group¥Apache¥logs¥access_log.1", production date/time "2007.2.1. 13:01:01, object identifier=none, file size=512 bytes, difference data 230="start point: head of the file, end point: terminal point of the file") and the difference detection data 220 (group name="host02 Apache access_log, file path="host02:C:¥Program Files¥Apache Group¥Apache¥logs¥access_log", production date/time "2007.3.1. 13:01:01, object identifier=none, file size=1024 bytes, difference data 230="start point: head of the file, end point: terminal point of the file"), which correspond to the previous difference detection file of the group B. Therefore, the difference data detection module 103 advances to the step S403.

The difference data detection module 103 checks whether or not there is the object identifier in the file data 201 of the difference management object file (step S403). Here, it is confirmed that there is no object identifier in the file data 201 of the difference management object file "host02:C:¥Program Files¥Apache Group¥Apache¥logs¥access_log." (No at step S403). In this case, the difference data detection module 103 checks whether or not the file name fixed field of the difference management object file fits to a condition of the file name fixed field corresponding to a verification object group (step S408). If the file name fixed field does not fit to the condition, the difference management object file is determined to be a new file (No at step S408). In this case, the whole difference management object file is determined as the difference data 300. Meanwhile, if the file name fixed field fits to the condition, the process flow advances to the comparing process of the production date/time performed at the step S405. Here, the file name fixed field "access_log" of the difference management object file "host02:C:¥Program Files¥Apache Group¥Apache¥logs¥access_log.1" fits to a first pattern of the fixed field of the file that corresponds to the group B, i.e., "preg_match_all ("/(access_log)(¥.[1-9]{0, 1})/", $filename, $matches);". Thus, the difference data detection module 103 advances to the comparing process of the production date/time (Yes at step S408).

The difference data detection module 405 checks whether or not there is the difference detection data 220 having the production date/time that matches the production date/time contained in the file data 201 (step S405). Here, it is confirmed that the production date/time (="2007.2.1. 13:01:01") that is contained in the file data 201 matches the production date/time (="2007.2.1. 13:01:01") of the difference detection data 220 (corresponds to previous difference detection file "host02:C:¥Program Files¥Apache Group¥Apache¥logs¥access_log.1").

Next, when there is the difference detection data 220 having the production date/time that matches the production date/time in the file data 201, the difference data detection module 103 compares the data size of the file in the file data 201 and the data size contained in the difference detection data 220 (step S406). With this, the sizes of the difference management object file and the previous difference detection file, which have the same production date/time, can be compared. When it is found at the step S406 that the size of the difference management object file is equal to or smaller than the size of the previous difference detection file, it is determined that there is no difference (step S407). In this case, the difference detection data 220 is not updated. Meanwhile, at the step S406, when the size of the difference management object file is larger than the size of the previous difference detection file, the data of the size difference is determined as the difference data 300. In this case, the difference data detection module 103 obtains the difference data 230 that designates next data from the terminal point of the previous difference detection file as a start point and designates the terminal point of the difference management object file as a terminal point of the data. Here, the size (="512 bytes") of the difference management object file "host02:C:¥Program Files¥Apache Group¥Apache¥logs¥access_log.1" is compared to the size (=512 bytes) of the previous difference detection file "host02:C:¥Program Files¥Apache Group¥Apache¥logs¥access_log.1" having the consistent production date/time, and it is confirmed that there is no difference in the file sizes (step S407). In this case, the difference data detection module 103 obtains the difference data 230 that designates the start point and the end point of the difference management object file "host02:C:¥Program Files¥Apache Group¥Apache¥logs¥access_log.1" as the start point and the end point of the difference data 300.

As described above, upon completion of the difference detection process executed at the step S303, the process flow advances to the step S304 shown in FIG. 7.

The difference data detection module 103 obtains the difference detection data 220 for the generation management type from the file data 201 that is obtained along with the difference management object file (step S304). Here, as the new difference detection data 220, the difference data detection module 103 obtains the file data 201 (file path "host02: C:¥Program Files¥Apache Group¥Apache¥logs ¥access_log.1", production date/time "2007.2.1. 13:01:01, object identifier=none, file size=512 bytes) of the difference management object file "host02:C:¥Program Files¥Apache Group¥Apache¥logs¥access_log.1", difference data 230="start point: head of the file, end point: terminal point of the file" and "group B" by relating to each other. Here, the file path is not essential to the difference detection data 220.

The difference data detection module 103 records the newly obtained difference detection data 220 on the difference detection data table 22 via the difference data management module 102 (step S305). Here, (group name=host02 Apache access_log", file path="host02:C:¥Program Files¥Apache Group¥Apache¥logs¥access_log.1", production date/time="2007.2.1. 13:01:01", object identifier="none", file size="512 bytes", difference data 230="start point: head of the file, end point: terminal point of the file") is recorded as the new difference detection data 220. At this point, it is not possible to refer to the difference detection data recorded on the difference detection data table 22. Therefore, the difference data management module 102 sets the newly recorded difference detection data 220 to be referable (step S306).

At the step S306, the difference data detection module 103 gives the obtained difference data 230 to the difference data output module 104. Here, the difference data detection module 103 informs the difference data output module 104, as the difference data 230, that there is no new data (difference data 300) in the difference management object file "host02:C: ¥Program Files¥Apache Group¥Apache¥logs¥access_log.1". The difference data output module 104 does not read the data from the difference management object file "host02:C:¥Program Files¥Apache Group¥Apache¥logs¥access_log.1" according to the difference data 230. The difference data management module 102 deletes the old difference detection data 220 corresponding to the group that is being currently processed (file path="host02: C:¥Program Files¥Apache Group¥Apache¥logs ¥access_log.1", production date/time "2007.2.1. 13:01:01", object identifier="none", file size="512 bytes", difference data 230="start point: head of the file, end point: terminal point of the file"), and sets the difference detection data 220 that is stored newly, to be referable. Here, the new difference detection data 220 (group name="host02 Apache access_log", file path="host02:C:¥Program Files¥Apache Group¥Apache¥ logs ¥access_log.1", production date/time "2007.2.1.13:01: 01", object identifier="none", file size="512 bytes", difference data 230="start point: head of the file, end point: terminal point of the file"), which is newly stored, is set to be referable.

In the difference management object file group 200, if there is a difference management object file that belongs to the B group and has not performed difference detection, the process flow advances to the step S303 (No at step S307). At the step S303, the next difference management object file is selected, and the difference detection process for the generation management type is executed thereon. Here, the difference management object file "host02:C:¥Program Files¥Apache Group¥Apache¥logs¥access_log" (file path=host02:C:¥Program Files¥Apache Group¥Apache¥logs¥access_log", production date/time "2007.3.1. 13:01:01", object identifier="none", file size="1024 bytes") is selected.

Details of the difference detection process executed at the step S303 will be described with reference to FIG. 8. The difference data detection module 103 checks whether or not there is the previous difference detection file that belongs to the group selected at the step S301 (step S401). Here, it is confirmed that there are the difference detection data 220 (group name="host02 Apache access_log", file path="host02:C:¥Program Files¥Apache Group¥Apache¥logs¥access_log.1", production date/time "2007.2.1.13:01:01", object identifier="none", file size="512 bytes", difference data 230="start point: head of the file, end point: terminal point of the file") and the difference detection data 220 (group name="host02 Apache access_log", file path="host02:C:¥Program Files¥Apache Group¥Apache¥logs¥access_log", production date/time "2007.3.1. 13:01:01", object identifier="none", file size="1024 bytes", difference data 230="start point: head of the file, end point: terminal point of the file"), which correspond to the previous difference detection file of the group B. Therefore, the difference data detection module 103 advances to the step S403.

The difference data detection module 103 checks whether or not there is an object identifier in the file data 201 of the difference management object file (step S403). Here, it is confirmed that there is no object identifier in the file data 201 of the difference management object file "host02:C:¥Program Files¥Apache Group¥Apache¥logs¥access_log.1" (No at step S403). In this case, the difference data detection module 103 checks whether or not the file name fixed field of the difference management object file fits to the condition of the file name fixed field corresponding to the verification object (step S408). If the file name fixed field does not fit to the condition, the difference management object file is determined as a new file (No at step S408). Here, the whole difference management object file is determined to be the difference data 300. Meanwhile, if the file name fixed field fits to the condition, the process flow advances to the comparing process of the production date/time executed at the step S405. Here, the file name fixed field "access_log" of the difference management object file "host02:C:¥Program Files¥Apache Group¥Apache¥logs¥access_log" fits to the first pattern of the fixed field of the file corresponding to the group B, i.e., "preg_match_all ("/(access_log)(¥.[1-9]{0, 1})/", $filename, $matches);". Thus, the difference data detection module 103 advances to the comparing process of the production date/time (Yes at step S408).

The difference data detection module 405 checks whether or not there is the difference detection data 220 having the production date/time that matches the production date/time contained in the file data 201 (step S405). Here, it is confirmed that the production date/time (="2007.3.1. 13:01:01") that is contained in the file data 201 matches the production date/time (="2007.3.1. 13:01:01") of the difference detection data 220 (corresponding to previous difference detection file "host02:C:¥Program Files¥Apache Group¥Apache ¥logs ¥access_log").

Next, when there is difference detection data 220 having the production date/time matching or coincident with that of the file data 201, the difference data detection module 103 compares the data size of the file within the file data 201 and the data size contained in the difference detection data 220 (step S406). Here, the file size (="2048 bytes") of the difference management object file "host02:C:¥Program Files¥Apache Group¥Apache¥logs¥access_log" is compared to the file size (=1024 bytes) of the previous difference detection file "host02:C:¥Program Files¥Apache Group¥Apache¥logs¥access_log", and it is confirmed that the file size of the difference management object file "host02: C:¥Program Files¥Apache Group¥Apache¥logs¥access_log" is larger by 1024 bytes (Yes at step S406). In this case, the data from a position that is 1024 bytes forward from the start point of the difference management object file to the terminal point of the file is determined as the difference data 300, since the size of the difference management object file is larger by 1024 bytes. Further, the difference data detection module 103 obtains the difference data 230 that designates the $1025^{th}$ byte of the difference management object file "host02:C:¥Program Files¥Apache Group¥Apache¥logs¥access_log" as the start point of the difference data 300 and its terminal point as the end point of the difference data 300 (step S409).

As described above, upon completion of the difference detection process executed at the step S303, the process flow advances to the step S304 shown in FIG. 7.

The difference data detection module 103 obtains the difference detection data 220 for the generation management type from the file data 201 that is obtained along with the difference management object file (step S304). Here, as the new difference detection data 220, the difference data detection module 103 obtains the file data 201 (file path="host02: C:¥Program Files¥Apache Group¥Apache ¥logs¥access_ log", production date/time "2007.3.1. 13:01:01, object identifier=none, file size=2048 bytes) of the difference management object file "host01:/var/adm/syslog/OLDsyslog.log", difference data 230="start point: $1025^{th}$ byte from the head of the file, end point: terminal point of the file" and "group B" by relating them to each other. Here, the file path is not essential to the difference detection data 220.

The difference data detection module 103 records the newly obtained difference detection data 220 on the difference detection data table 22 via the difference data management module 102 (step S305). Here, (group name=host02 Apache access_log", file path="host02:C:¥Program Files¥Apache Group¥Apache¥logs¥access_log", production date/time "2007.3.1. 13:01:01", object identifier="none", file size="2048 bytes", difference data 230="start point: $1025^{th}$ byte from the head of the file, end point: terminal point of the file") is recorded as the new difference detection data 220. At this time point, it is not possible to refer to the difference detection data recorded on the difference detection data table 22. Therefore, the difference data management module 102 sets the newly recorded difference detection data 220 to be referable (step S306).

Referring to FIG. 9, the difference data detection module 103 gives the obtained difference data 230 to the difference data output module 104 (step S501). The difference data output module 104 sequentially reads the data from the start point to the end point of the difference indicated by the difference data 230 from the difference management object file corresponding to the difference data 230, and outputs the read out data as the difference data 300 (step S502). Here, the data from the $1025^{th}$ byte of the difference management object file "host02:C:¥Program Files¥Apache Group¥Apache¥logs¥access_log" to the terminal point ($2048^{th}$ byte) is sequentially read by referring to the difference data 230, and the readout data is outputted to the output unit 15. At this time, the difference data management module 102 deletes the old difference detection data 220 (the difference detection data 220 of the previous difference detection file "host02:C:¥Program Files¥Apache Group¥Apache¥logs¥access_log") corresponding to the group that is currently processed, and sets the difference detection data 220 that is stored newly, to be referable. Here, the new difference detection data 220 (group name=host02 Apache access_log", file path="host02:C:¥Program Files¥Apache Group¥Apache¥logs¥access_log", production date/time "2007.3.1. 13:01:01", object identifier="none", file size="2048 bytes", difference data 230="start point: $1025^{th}$ byte from the head of the file, end point: terminal point of the file"), which is newly stored, is set to be referable.

The process at steps S303 to S306 is executed for all the difference management object files that belong to the selected group (step S307). Upon completion of the process of the steps S303 to S306 for all the difference management object files within the group, the process flow advances to a step S308 (Yes at step S307). At the step S308, it is checked to see whether or not the difference detection process has been executed for all the files in the difference management object file group 200. If it is found that there is an unselected difference management object file, the process flow advances to the step S301 where the group to which the file belongs is selected, and the difference detection process is executed. In this manner, the difference detection step S301 and the subsequent are executed for all the groups to which the obtained difference management object file group 200 belongs. Here, since the obtained difference management object file belongs only to the group B, the difference detection process is executed only for the difference management object file group 200 that belongs to the group B.

As described above, the difference detection data 220 (file path="host02:C:¥Program Files¥Apache Group¥Apache¥logs¥access_log.1", production date/time "2007.2.1. 13:01:01", object identifier="none", file size="512 bytes", difference data 230="start point: head of the file, end point: terminal point of the file") and the difference detection data 220 (file path="host02:C:¥Program Files¥Apache Group¥Apache¥logs¥access_log", production date/time "2007.3.1. 13:01:01", object identifier="none", file size="1024 bytes", difference data 230="start point: head of the file, end point: terminal point of the file"), which have been recorded previously as the difference detection data 220 corresponding to the group B, are deleted while the difference detection data 220 (difference management object file) (file path="host02:C:¥Program Files¥Apache Group¥Apache¥logs¥access_log.1", production date/time "2007.2.1. 13:01:01", object identifier="none", file size="512 bytes", difference data 230="start point: $1025^{th}$ byte from the head of the file, end point: terminal point of the file") and the difference detection data 220 (file data 201: file path="host02:C:¥Program Files¥Apache Group¥Apache¥logs¥access_log", production date/time "2007.3.1. 13:01:01", object identifier="none", file size="2048 bytes", difference data 230="start point: $1025^{th}$ byte from the head of the file, end point: terminal point of the file") are recorded as the new difference detection data 220 corresponding to the group B.

In the present invention, even if there is no object identifier contained in the difference management object file, it is possible to extract the previous difference detection file that is the same file as the difference management object file and detect differences between the files by performing verification of the file name fixed fields and comparing the production date/time.

Next, details of the difference detection process for a database type difference management object file will be described which is executed in the initial state that the difference detection data 220 is not recorded on the difference detection data table 22.

The difference data detection module 103 obtains the difference management object file group 200 and the corresponding file data 201 in response to an instruction to execute the difference detection process (step S201). Here, the difference data detection module 103 obtains the difference management object file (file data 201: file path="host03:C:¥Documents and Settings¥user1¥My Documents¥event.csv", production date/time "2007.2.2. 14:02:02", object identifier="none", file size="512 bytes") as the difference management object file group 200.

Next, the difference data detection module 103 obtains the group data 210 of the groups A, B, and C registered in the group data table 21 (step S202).

Since the difference detection data 220 has not been recorded on the difference detection data table 22 in the initial state, the difference data detection module 103 obtains the difference detection data 220 indicating "no difference detection data" (step S203).

The difference data detection module 103 divides the obtained difference management object file group into groups based on the group data 210 (step S204). Here, the obtained difference management object file "host03:C:¥Documents and Settings¥user1¥My Documents¥event.csv" is related to the group C, since the file fits to the group condition "host03:C/¥¥Documents and Settings¥¥user1¥¥My Documents¥¥event¥.csv" for the group C (group name: "host03 event.csv").

The difference data detection module 103 executes the difference detection process on all the files in the obtained difference management object file group 200, and updates the difference detection data table (step S205). Details of the difference detection process executed at the step S205 will be described with reference to FIG. 7.

First, the difference data detection module 103 selects a single group, and starts the difference detection process of the difference management object file that belongs to the group (step S301). Here, the group C is selected. Upon selecting the group, the difference data detection module 103 checks the type of the group (step S302). When the selected group is the "database type" or the "recursive type", the process flow advances to the step S309 (No at step S302).

Since the group C is of the database type, the difference data detection module 103 selects the difference management object file belonging to the group C, and executes the difference detection process for the database type (step S309). Here, the difference management object file "host03:C/¥¥Documents and Settings¥¥user1¥¥My Documents¥¥event¥.csv" is selected. FIG. 10 shows the details of the difference detection process for the database type executed at the step S309.

Referring to FIG. 10, the difference data detection module 103 checks whether or not there is a previous difference detection file that belongs to the group selected at the step S301 (step S601). When there is a previous difference detection file in that group, i.e., when difference detection data 220 related to the group has already been recorded, the process flow advances to a step S603 (Yes at step S601). Meanwhile, when there is no previous difference detection file belonging to that group, i.e., when difference detection data 220 related to the group has not been recorded yet, the difference data detection module 103 determines the whole data of the difference management object file selected at the step S303 as the difference data 300 (step S602). At this time, the difference data detection module 103 obtains the start point and the end point of the data in the difference management object file as the difference data 230.

Since this is the first-time detection of the difference for the group C, it is confirmed that there is no previous difference detection file. In this case, the whole data of the difference management object file "host01:/var/adm/syslog/OLDsyslog.log" is determined as new data, i.e., determined as difference data 300 at the step S602. Further, the difference data detection module 103 obtains the difference data 203 that designates the start point and the terminal point of the data of the difference management object file "host03:C/¥¥Documents and Settings¥¥user1¥¥My Documents¥¥event¥.csv" as the start point and the end point of the difference data 300.

As described above, upon completion of the difference detection process at the step S303, the process flow advances to the step S304 shown in FIG. 7.

The difference data detection module 103 obtains the difference detection data 220 for the database type from the file data 201 that is obtained along with the difference management object file (step S310). At this time, the difference detection data 220 contains the difference data 230 that indicates a read-out position of the difference data 300. The difference data 230 for the database type contains the data in which the timestamp changes at least once (may be more) when traced back from the last data of the difference management object file. When the data of the difference management object are arranged in an ascending order as in the followings, for example, i.e., "2007/03/01 10:10:10 message_1", "2007/03/01 10:10:10 message_2", "2007/03/01 10:10:10 message_3", "2007/03/01 10:10:10 message_1", "2007/03/01 10:10:10 message_2", "2007/03/01 10:10:11 message _3", "2007/03/01 10:10:11 message_1", "2007/03/01 10:10:12 message_2", "2007/03/01 10:10:12 message_3", the difference data 230 for the database type in this case is the data from the last data ("2007/03/01 10:10:12 message_3") until the data ("2007/03/01 10:10:11 message_1") where the timestamp changes once. That is, the difference data 230 contains "2007/03/01 10:10:11 message_1", "2007/03/01 10:10:12 message_2", "2007/03/01 10:10:12 message_3".

The difference data detection module 103 records the newly obtained difference detection data 220 on the difference detection data table 22 via the difference data management module 102 (step S305). At this point, it is not possible to refer to the difference detection data recorded on the difference detection data table 22. Therefore, the difference data management module 102 sets the newly recorded difference detection data 220 to be referable (step S306).

Referring to FIG. 9, the difference data detection module 103 gives the obtained difference data 230 to the difference data output module 104 (step S501). The difference data output module 104 sequentially reads the data from the start point to the end point of the difference indicated by the difference data 230 from the difference management object file that corresponds to the difference data 230, and outputs the read out data as the difference data 300 (step S502). Here, the whole data of the file "host03:C:¥Documents and Settings¥user1¥My Documents¥event.csv" is read in, and outputted to the output unit 15. At this time, the difference data management module 102 deletes the old difference detection data 220 (the difference detection data 220 of the previous difference detection file) corresponding to the group that is processed this time, and sets the difference detection data 220 that is stored newly this time to be referable. Here, there is no difference detection data to be deleted, so that the difference detection data 220 (file path="host03:C:¥Documents and Settings¥user1¥My Documents¥event.csv", production date/time="2007, 2. 2. 14:02:02", object identifier="none", file size="512 bytes", difference data 230="2007/03/01 10:10:11 message_1", "2007/03/01 10:10:12 message_2", "2007/03/01 10:10:12 message_3"), which is newly stored this time, is set to be referable.

The process at the steps S303 to S306 is executed for all the difference management object files that belong to the selected group (step S307). Here, the obtained difference management object file belongs only to the group C, so that the difference detection process is executed only for the difference management object file group 200 that belongs to the group C.

Next, a case will be described that there is an instruction for the difference data detection module 103 to perform new difference data detection process in a state where the above-described difference detection data 220 is recorded on the difference data table 22.

The difference data detection module 103 obtains the difference management object file group 200 and the corresponding file data 201 in response to the instruction for performing the difference detection process (step S201). Here, the difference data detection module 103 obtains the difference management object file (file data 201: file path="host03: C:¥Documents and Settings¥user1¥My Documents¥event.csv", production date/time="2007, 3. 3. 15:03:03", object identifier="none", file size="512 bytes") as the difference management object file group 200.

Next, the difference data detection module 103 obtains the group data 210 of the groups A, B, and C registered in the group data table 21 (step S202).

The difference data management module 102 refers to the difference detection data table 22, and gives the already recorded difference detection data 220 (group name="host03 event.csv" fail path="host03:C:¥Documents and Settings¥user1¥My Documents¥event.csv", production date/time="2007, 2. 2. 14:02:02", object identifier="none", file size="512 bytes", difference data 230="2007/03/01 10:10:11 message_1", "2007/03/01 10:10:12 message_2", "2007/03/01 10:10:12 message_3") to the difference data detection module 103 (step S203).

The difference data detection module 103 puts the obtained difference management object file group 200 into groups based on the group data 210 (step S204). Here, the obtained difference management object file "host03:C:¥Documents and Settings¥user1¥My Documents¥event.cvs" is related to the group C, since the file fits to the group condition "host03: C:¥Documents and Settings¥¥user1¥¥My Documents¥¥event¥.cvs" for the group C.

The difference data detection module 103 performs the difference detection process on all the files within the obtained difference management object file group 200, and updates the difference detection data table (step S205). Details of the difference detection process executed at the step S205 will be described by referring to FIG. 7.

First, the difference data detection module 103 selects a single group, and starts the difference detection process of the difference management object file that belongs to the group (step S301). Here, the group C is selected. Upon selecting the group, the difference data detection module 103 checks the type of the group (step S302).

The group C is the database type, so that the difference data detection module 103 selects the difference management object file belonging to the group C, and performs the difference detection process for the database type (step S309). Here, the difference management object file "host03:C: ¥Documents and Settings¥user1¥My Documents¥event.csv" is selected.

Details of the difference detection process executed at the step S306 will be described by referring to FIG. 10. The difference data detection module 103 checks whether or not there is a previous difference detection file that belongs to the group selected at the step S301 (step S601). Here, it is confirmed that there is the difference detection data 220 ("host03: C:¥Documents and Settings¥¥user1¥¥My Documents¥event.csv", production date/time="2007, 2. 2. 14:02:02", object identifier="none", file size="512 bytes", difference data 230="2007/03/01 10:10:11 message_1", "2007/03/01 10:10:12 message_2", "2007/03/01 10:10:12 message_3"), which corresponds to the previous difference detection file of the group C. Therefore, the difference data detection module 103 advances to the step S603.

The difference data detection module 103 searches for a position of the oldest data in the difference management object file "host03:C:¥Documents and Settings¥user1¥My Documents¥event.csv" (step S603). Here, the difference data detection module 103 refers to the timestamps, and judges the start point of the file as the position of the oldest data when the data within the difference management object file is arranged in an ascending order, while judging the end point of the file as the position of the oldest data when the data is arranged in a descending order.

Next, the difference data detection module 103 searches for the start position of the difference data 300 from the position of the oldest data (step S604). More specifically, the difference data detection module 103 searches for a position of data that does not exist in the previous difference detection file, from the position of the oldest data in the difference management object file. The difference data detection module 103 searches for the data that matches the difference data contained in the difference detection data 220 in order from the oldest data of the difference management object file, and determines the next data of the matched data as the start position of the difference data 300. Here, if there is no data that matches the difference data 230, the difference data detection module 103 deletes the old data within the difference data 230 one by one from the oldest one so that there is a match a position of the oldest data in the difference management object file. With this, the oldest data in the difference management object file can be matched the oldest data in the difference data 230. When the positions of the oldest data in both can be matched each other, the difference data detection module 103 judges the next data of the matched data as the start position of the difference data 300 that is not in a previous difference detection file.

When the start position of the difference data 300 cannot be found at the step S604, it is determined that there is no difference. That is, when the whole data within the difference data 230 is deleted, it is determined that the whole data in the file is the difference data 300 (No at step S605, S607). In this case, the difference detection data 220 is not updated. Meanwhile, when the start position of the difference data 300 is found, the data from the start position to the latest data position is determined as the difference data 300 (Yes at steps S605 and S606). In this case, the difference data detection module 103 obtains the data from the found start position to the latest data position as new difference data 230. Here, it is assumed that start position is the position of the next data of the data that matches the data of the difference data 230.

As described above, upon completion of the difference detection process executed at the step S303, the process flow advances to the step S304 shown in FIG. 7.

The difference data detection module 103 obtains the difference detection data 220 for the database type from the file data 201 that is obtained along with the difference management object file (step S310). At this time, the difference detection data 220 contains the difference data 230 that indicates the read-out position of the difference data 300. Here, as the new difference detection data 220, the difference data detection module 103 obtains the file data 201 (file data 201: file path="host03:C:¥Documents and Settings¥user1¥My Documents¥event.csv", production date/time="2007, 2. 2. 14:02:02", object identifier="none", file size="512 bytes") of the difference management object file "host03:C:¥Documents and Settings¥user1¥My Documents¥event.csv", difference data 230 obtained at the step S307 (difference data 230="start point: position of the next data of the matched data, end point: position of the latest data" and "group C") by relating them to each other. Note here that the file path is not essential as the difference detection data 220.

The difference data detection module 103 records the newly obtained difference detection data 220 to the difference detection data table 22 via the difference data management module 102 (step S311). Here, as the new difference detection data 220, (file data 201: file path="host03:C:¥Documents and Settings¥user1¥My Documents¥event.csv", production date/time="2007, 2. 2. 14:02:02", object identifier="none", file size="512 bytes", difference data 230) is recorded by being related to the group C. At this point, it is not possible to refer to the difference detection data recorded to the difference detection data table 22. Therefore, the difference data management module 102 sets the newly recorded difference detection data 220 to be referable (step S312).

Referring to FIG. 9, the difference data detection module 103 gives the obtained difference data 230 to the difference data output module 104 (step S501). The difference data output module 104 sequentially reads the data from the start point to the end point of the difference indicated by the difference data 230 from the difference management object file corresponding to the difference data 230, and outputs the read out data as the difference data 300 (step S502). Here, the data from the start point (position of the next data of the matched data) of the difference in the difference management object file "host03:C:¥Documents and Settings¥user1¥My Documents¥event.csv" to the position of the latest data (the end point of the file in case of the ascending order, or the start point in case of the descending order) is sequentially read by referring to the difference data 230, and the readout data is outputted to the output unit 15. At this time, the difference data management module 102 deletes the old difference detection data 220 (the difference detection data 220 of the previous difference detection file) corresponding to the group that is currently processed, and sets the difference detection data 220 that is stored newly, to be referable. Here, the new difference detection data 220 (group name="host03 event.csv", file path="host03:C:¥Documents and Settings¥user1¥My Documents¥event.csv", production date/time="2007.2.2. 14:02:02", object identifier="none", file size="512 bytes", difference data 230="start point: position of the next data of the matched data, end point: position of the latest data"), which is newly stored, is set to be referable.

The process at the steps S309 to S312 is executed for all the difference management object files that belong to the selected group (step S313). Upon completion of the steps S309 to step S312 for all the difference management object files in the group, the process flow advances to the step S308 (Yes at step S313). At the step S308, it is checked to see whether or not the difference detection process has been executed for all the files within the difference management object file group 200. If it is found that there is an unselected difference management object file, the process flow advances to the step S301 where the group to which that file belongs is selected, and the difference detection process is executed. In this manner, the difference detection step S301 and the subsequent are executed for all the groups to which the obtained difference management object file group 200 belong. Here, since the obtained difference management object file belongs only to the group C, the difference detection process is executed only for the difference management object file group 200 that belongs to the group C.

As described above, the file difference management apparatus 10 according to the present invention detects the start position of the difference data 300 in the obtained difference management object file by finding the position of the oldest data and the position of the latest data based on the timestamps. More specifically, the file difference management apparatus 10 keeps, as the difference data 230, the data from the (latest) one that has the largest timestamp within the file at the time of detecting the difference at least to the data having the second largest timestamp when traced back from the one with the largest timestamp. In the difference management object file, the file difference management apparatus 10 can search for a part that completely matches the difference data 230 from the position of the data (oldest) having a smallest timestamp towards the position of the data having the largest timestamp, and obtain the data from the next data of the first matched data to the data having the largest timestamp (from the start point of the difference to the end point thereof) as the new difference data 230. Further, when the both do have a complete matching part, the file difference management apparatus 10 deletes a single piece of the oldest data of the difference detection data that is being kept, and compares it with the position of the data having the smallest timestamp in the object file (the process of deleting and making comparison is executed until the positions thereof match each other). When the positions come to match each other because of deletions, it is possible to obtain the data from the next data of the matched data to the data having the largest timestamp as the start point of the difference to the end point thereof. When the difference data 230 is deleted completely, it is determined that the whole object file is the new data. As described, the file difference management apparatus 10 according to the present invention is capable of detecting the differences even with the files where each data has the timestamp, and the data is deleted in order from the oldest one.

Next, differences between the difference management for the database type file and the difference management for the recursive-type file will be described. The difference detection process for the recursive-type difference management object file is different from that of the database type only in terms of the step S603, and other process is the same.

When searching for a position of the oldest data of the "recursive type" difference management object file at the step S603, the difference data detection module 103 checks a relation of the timestamps of the data before and after, and takes a position having the largest difference in a part where the timestamps are retrogressed as the position of the oldest data.

When the data are arranged as follows, for example, "2007/03/01 10:10:10 msg_A", "2007/03/01 10:10:11 msg_B", "2007/03/01 10:10:10 msg_C", "2007/02/01 10:10:11 msg_D", "2007/02/01 10:10:10 msg_E", the position of the data "2007/03/01 10:10:11 msg_D", which is the data whose timestamp is retrogressed and the difference is the largest, is the position of the oldest data. Further, the position of the latest data is the position of the data "2007/03/01 10:10:10 msg_C", which is the data positioned before the data having the largest difference, is the position of the latest data.

As described above, it is possible with the present invention to find the position of the oldest data and the position of the latest data based on the timestamps even if the files are the recursive type files.

The present invention sets the range of file difference management as the files within a same group, and judges whether or not the files are the same files in the same group by using the object identifies, file generated data/time, file names, and the like of the file group of the previous difference detection and the file group of the current detection. Therefore, it is possible to perform the file difference management even if the file names are changed. Further, when the files are determined as the same files, the position of the newly added data can be obtained by using the file sizes. In this case, the file difference management apparatus 10 according to the present invention can detect the difference without comparing the contents of the files, so that it is unnecessary to keep the contents of the previous difference detection file. Therefore, the storage capacity required for performing the difference management can be reduced.

Further, in case of a file (database type) having the data with timestamps taken out from a database or a case of a file (recursive type) that recursively outputs data with timestamps to a single file, the file difference management apparatus 10 can detect the start point and the end point of the difference data 300 based on the timestamps.

Therefore, in a system which collects log files on a regular basis, the present invention can be applied to a device (program) for collecting only new log data from the log files.

In the above, the exemplary embodiments of the present invention have been described in details. However, specific configurations thereof are not to be limited to the above-described exemplary embodiments, and it is intended to include various changes and modifications without departing from the broad scope of the present invention. The exemplary embodiments have been described by referring to the case of the file difference management apparatus to which the three types of groups, i.e., the generation management type, the database type, and the recursive type, are registered. However, the types and the number of the groups to be registered are not limited only to those, as long as there is one kind or more. Further, the difference management object file group 200 obtained by the file difference management apparatus 10 may contain file groups that correspond to a plurality of kinds of groups.

While the present invention has been particularly shown and described with reference to the exemplary embodiments thereof, the present invention is not limited to these exemplary embodiments. It will be understood by those of ordinary skill in the art that various changes in form and details may be made therein without departing from the spirit and scope of the present invention as defined by the claims.

What is claimed is:

1. A file difference management apparatus comprising:
a storage unit in which a group data table and a difference detection data table are stored;
a difference data detection module configured to search a previous difference detection file which is an original file of an difference management object file and detect a difference between said previous difference detection file and said difference management object file; and
a difference data management module configured to record a difference detection data used to detect the difference on said difference detection data table,
wherein said difference data detection module:
selects a group to which said difference management object file belongs, based on a group condition registered on said group data table, the group including a plurality of object files including said difference management object file, the group specified by at least a date and time in which said object files have been generated, such that said object files are not specified a priori by filename,
where a first type of processing is specified, extracts the difference detection data related to said group from said difference detection table without comparing the extracted difference detection data and a file data of said difference management object file, where a second type of processing is specified, extracts the difference detection data related to said group from said difference detection table by locating difference extraction start data within said difference object file and extracting the difference detection data starting at the difference extraction start data, detects the difference between said difference management object file and said previous difference detection file, based on a comparing result of the extracted difference detection data and the file data of said difference management object file, and said difference data management module records a set of said file data and said group as a new difference detection data on said difference detection data table, when the difference is detected, wherein data necessary for a next difference detection operation is stored in said difference detection table, and wherein a filename of each object file in the group is dynamic, and includes the date and time at which said object file has been generated.

2. The file difference management apparatus according to claim 1, further comprising:

a difference management object registration module configured to register one of a generation management type, a database type and a recursive type as a type of said group to which said difference management object file belongs, on said group data table, wherein said difference data detection module executes a difference detection process corresponding to said group to which said difference management object file belongs.

3. The file difference management apparatus according to claim 2, wherein said difference data detection module compares a first file size contained in said file data and a second file size contained in the extracted difference detection data of said group, when said group to which said difference management object file belongs is of the generation management type, determines a difference between the first file size and the second file size as a difference data, when the first file size is larger than the second file size, and determines that there is no difference data when the first file size is equal to or smaller than the second file size.

4. The file difference management apparatus according to claim 3, wherein said difference data detection module searches said difference detection data table for a difference detection data having a production date/time matching that contained in said file data, and determines the difference detection data having the matching production date/time as the extracted difference detection data.

5. The file difference management apparatus according to claim 4, wherein said difference data detection module searches said difference detection data table for a difference detection data having an object identifier matching that contained in said file data, and checks whether the production date/time of the difference detection data having the matching object identifier matches that contained in the file data.

6. The file difference management apparatus according to claim 5, wherein said difference data detection module checks whether or not a file path contained in said file data fits to a determination condition of a fixed field of a file name set to said group, when said file data does not contain the object identifier, and checks whether or not there is the difference detection data having the production date/time matching that contained in the file data in said difference detection data table, when the file path fits to the determination condition.

7. The file difference management apparatus according to claim 2, wherein when said group to which said difference management object file belongs is of said database type or of said recursive type, said difference data detection module searches a difference detection object file for the oldest data based on a time stamp of said difference management object file, and determines a start position of said difference data from a position of the oldest data and a data from the start position to the latest position in the difference detection object file as said difference data.

8. The file difference management apparatus according to claim 1, wherein said difference data detection module determine to be no difference data when there is not a difference detection data for said group to which said difference management object file belongs, and determines the whole of said difference management object file as the difference data.

9. The file difference management apparatus according to claim 1, wherein said difference data management module sets a data indicating the positions of said difference in said difference management object file as said difference data, and records said difference data in relation to the new difference detection data, on said difference detection data table.

10. The file difference management apparatus according to claim 9, further comprising:

a difference data output module configured to read out said difference data from said difference management object file based on said difference detection data.

11. A file difference management method comprising:

selecting a group to which a difference management object file belongs, based on a group condition registered on a group data table, the group including a plurality of object files including said difference management object file, the group specified by at least a date and time in which said object files have been generated, such that said object files are not specified a priori by filename;

where a first type of processing is specified, extracting difference detection data related to said group from said difference detection table without comparing the extracted difference detection data and a file data of said difference management object file;

where a second type of processing is specified, extracting the difference detection data related to said group from said difference detection table by locating difference extraction start data within said difference object file and extracting the difference detection data starting at the difference extraction start data;

detecting a difference between a difference management object file and a previous difference detection file used for detection of a difference detection data, based on a comparing result of a difference detection data of said group and the file data of said difference management object file; and recording a set of said file data and said group as said difference detection data on said difference detection data table, when the difference is detected, wherein data necessary for a next difference detection operation is stored in said difference detection table, and wherein a filename of each object file in the group is dynamic, and includes the date and time at which said object file has been generated.

12. The file difference management method according to claim 11, wherein said selecting comprises:

registering one of a generation management type, a database type and a recursive type as a type of said group to which said difference management object file belongs, on said group data table, and said detecting comprises:
executing a difference detection process corresponding to the type of said group to which said difference management object file belongs.

13. The file difference management method according to claim 12, wherein said executing comprises:
comparing a first file size contained in said file data and a second file size contained in said difference detection data of said group, when said group to which said difference management object file belongs is of the generation management type;
determining a difference between the first file size and the second file size as a difference data, when the first file size is larger than the second file size; and
determining that there is no difference data when the first file size is equal to or smaller than the second file size.

14. The file difference management method according to claim 13, wherein said executing further comprises:
searching said difference detection data table for a difference detection data having a production date/time matching that contained in said file data; and
determining the difference detection data having the matching production date/time as the difference detection data.

15. The file difference management method according to claim 14, wherein said executing further comprises:
searching said difference detection data table for a difference detection data having an object identifier matching that contained in said file data; and
checking whether the production date/time of the difference detection data having the matching object identifier matches that contained in the file data.

16. The file difference management method according to claim 15, wherein said executing further comprises:
checking whether or not a file path contained in the file data fits to a determination condition of a fixed field of a file name set to said group, when said file data does not contain the object identifier; and
checking whether or not there is the difference detection data having the production date/time matching that contained in the file data in a difference detection data table, when the file path matches the condition.

17. The file difference management method according to claim 12, wherein said executing comprises:
searching a difference detection object file for the oldest data based on a time stamp of said difference management object file, when the group to which said difference management object file belongs is of said database type or of said recursive type; and
determining a start position of a difference data from a position of the oldest data and a data from the start position to the latest position in the difference detection object file as the difference data.

18. The file difference management method according to claim 11, further comprising:
determining to be no difference data, when there is not a difference detection data for the group to which said difference management object file belongs; and
determining the whole of said difference management object file as the difference data.

19. The file difference management method according to claim 11, further comprising:
setting a data indicating the positions of said difference in said difference management object file as a difference data; and
recording said difference data and said difference detection data on said difference detection data table.

20. The file difference management method according to claim 19, further comprising:
reading out said difference data from said difference management object file based on said difference detection data.

21. A non-transitory computer-readable data storage medium storing computer program code, wherein execution of the computer program code by a processor causes a method for realizing a file difference management method to be performed, the method comprising:
selecting a group to which a difference management object file belongs, based on a group condition registered on a group data table, the group including a plurality of object files including said difference management object file, the group specified by at least a date and time in which said object files have been generated, such that said object files are not specified a priori by filename;
where a first type of processing is specified, extracting difference detection data related to said group from said difference detection table without comparing the extracted difference detection data and a file data of said difference management object file;
where a second type of processing is specified, extracting the difference detection data related to said group from said difference detection table by locating difference extraction start data within said difference object file and extracting the difference detection data starting at the difference extraction start data;
detecting a difference between a difference management object file and a previous difference detection file used for detection of a difference detection data, based on a comparing result of a difference detection data of said group and the file data of said difference management object file; and
recording a set of said file data and said group as said difference detection data on said difference detection data table, when the difference is detected,
wherein data necessary for a next difference detection operation is stored in said difference detection table,
and wherein a filename of each object file in the group is dynamic, and includes the date and time at which said object file has been generated.

* * * * *